United States Patent
Gardner et al.

(10) Patent No.: US 7,847,421 B2
(45) Date of Patent: Dec. 7, 2010

(54) SYSTEM FOR GENERATING ELECTRICAL ENERGY FROM AMBIENT MOTION

(75) Inventors: John F. Gardner, Boise, ID (US);
Layne Ellen Simmons, Middleton, ID (US); Ronald Scott Jackson, Boise, ID (US); Steven E. Yano, Eagle, ID (US)

(73) Assignee: Willowview Systems, Inc., Boise, ID (US)

( * ) Notice: Subject to any disclaimer, the term of this patent is extended or adjusted under 35 U.S.C. 154(b) by 337 days.

(21) Appl. No.: 12/018,042

(22) Filed: Jan. 22, 2008

(65) Prior Publication Data

US 2008/0174120 A1 Jul. 24, 2008

Related U.S. Application Data

(60) Provisional application No. 60/881,325, filed on Jan. 19, 2007.

(51) Int. Cl.
| | |
|---|---|
| *F02B 63/04* | (2006.01) |
| *F03G 7/08* | (2006.01) |
| *H02K 7/18* | (2006.01) |
| *F02B 67/04* | (2006.01) |
| *F03B 13/10* | (2006.01) |
| *F03B 13/12* | (2006.01) |
| *H02P 9/04* | (2006.01) |

(52) U.S. Cl. .................. 290/1 R; 290/1 E; 290/42; 290/53

(58) Field of Classification Search .................. 290/1 E, 290/1 R, 42, 53
See application file for complete search history.

(56) References Cited

U.S. PATENT DOCUMENTS

| | | | | |
|---|---|---|---|---|
| 2,791,732 A | * | 5/1957 | Jones .......................... | 318/119 |
| 2,900,592 A | | 10/1958 | Baruch ........................ | 363/102 |
| 2,921,252 A | | 1/1960 | Schiavone ................... | 322/2 R |
| 3,011,062 A | * | 11/1961 | Goldsmith ................... | 290/53 |
| 3,250,140 A | | 5/1966 | Russell ........................ | 74/126 |
| 3,339,077 A | * | 8/1967 | Shapiro ....................... | 290/1 R |
| 3,349,305 A | * | 10/1967 | Dietsch ....................... | 318/128 |
| 3,366,865 A | * | 1/1968 | Shapiro ....................... | 320/101 |

(Continued)

FOREIGN PATENT DOCUMENTS

WO   WO 2007/016781 A1   8/2005

(Continued)

OTHER PUBLICATIONS

M2E Power, Inc., Mobile Power Generation Solutions, "Promises to transform energy generation by delivering cleantech power to mobile devices," http://www.m2epower.com/, printed Apr. 8, 2008, 2 pgs.

(Continued)

*Primary Examiner*—T. C. Patel
*Assistant Examiner*—Pedro J Cuevas
(74) *Attorney, Agent, or Firm*—John R. Thompson; Stoel Rives LLP

(57) ABSTRACT

A system for generating electrical energy from ambient motion that comprises two stages, a resonating electrical generator and a kinetic energy conversion system. The different stages have differing resonant frequencies to enable harvesting energy from low frequency ambient motion and converting it to high frequency resonant oscillation for efficiently generating electrical energy.

16 Claims, 18 Drawing Sheets

U.S. PATENT DOCUMENTS

| | | | | |
|---|---|---|---|---|
| 3,894,241 | A * | 7/1975 | Kaplan | 290/42 |
| 3,959,663 | A * | 5/1976 | Rusby | 290/53 |
| 4,110,630 | A * | 8/1978 | Hendel | 290/53 |
| 4,196,365 | A * | 4/1980 | Presley | 310/23 |
| 4,228,360 | A * | 10/1980 | Navarro | 290/43 |
| 4,260,901 | A * | 4/1981 | Woodbridge | 290/42 |
| 4,423,334 | A * | 12/1983 | Jacobi et al. | 290/53 |
| 4,610,140 | A * | 9/1986 | Thompson, Jr. | 60/506 |
| 4,612,768 | A * | 9/1986 | Thompson, Jr. | 60/506 |
| 4,618,861 | A | 10/1986 | Gettens et al. | 340/10.41 |
| 4,832,155 | A | 5/1989 | Raju | 185/30 |
| 5,424,582 | A * | 6/1995 | Trepl et al. | 290/53 |
| 5,460,099 | A * | 10/1995 | Matsuhisa et al. | 105/148 |
| 5,585,680 | A * | 12/1996 | Tsoffka | 310/49.32 |
| 5,929,531 | A * | 7/1999 | Lagno | 290/53 |
| 6,367,967 | B1 | 4/2002 | Kojima et al. | 368/185 |
| 6,700,248 | B2 * | 3/2004 | Long | 310/80 |
| 6,825,574 | B1 | 11/2004 | Mooring | 290/1 R |
| 6,982,497 | B2 | 1/2006 | Rome | 290/1 A |
| 7,105,939 | B2 | 9/2006 | Bednyak | 290/42 |
| 7,151,322 | B2 * | 12/2006 | Eskandr | 290/1 R |
| 7,239,038 | B1 * | 7/2007 | Zimmerman et al. | 290/54 |
| 7,304,398 | B1 | 12/2007 | Kim et al. | 290/1 E |
| 7,375,436 | B1 * | 5/2008 | Goldin | 290/42 |
| 7,476,984 | B2 * | 1/2009 | Kim et al. | 290/1 E |
| 7,626,279 | B2 * | 12/2009 | Brown et al. | 290/1 R |
| 7,626,281 | B2 * | 12/2009 | Kawai | 290/54 |
| 2002/0172060 | A1 * | 11/2002 | Takeuchi | 363/110 |
| 2004/0119351 | A1 | 6/2004 | Schwarzli | 310/75 R |
| 2004/0178634 | A1 * | 9/2004 | Eskandr | 290/1 R |
| 2004/0183306 | A1 | 9/2004 | Rome | 290/1 R |
| 2004/0222637 | A1 | 11/2004 | Bednyak | 290/1 R |
| 2004/0222638 | A1 | 11/2004 | Bednyak | 290/1 R |
| 2005/0162279 | A1 | 7/2005 | Marshall et al. | 340/573.2 |
| 2006/0163876 | A1 * | 7/2006 | Eskandr | 290/1 R |
| 2006/0192386 | A1 | 8/2006 | Rome | 290/1 R |
| 2007/0007827 | A1 | 1/2007 | Harris et al. | 310/15 |
| 2007/0064525 | A1 | 3/2007 | Sanders et al. | 367/4 |
| 2007/0159011 | A1 | 7/2007 | Terzian et al. | 310/15 |
| 2007/0210580 | A1 | 9/2007 | Roberts et al. | 290/1 R |
| 2008/0001578 | A1 | 1/2008 | Cap | 322/3 |
| 2008/0074083 | A1 | 3/2008 | Yarger et al. | 320/137 |
| 2008/0164701 | A1 | 7/2008 | Brown et al. | 290/1 E |
| 2008/0164702 | A1 | 7/2008 | Brown et al. | 290/1 E |
| 2010/0045119 | A1 * | 2/2010 | Jackson et al. | 310/20 |
| 2010/0236440 | A1 * | 9/2010 | Rastegar | 102/209 |

FOREIGN PATENT DOCUMENTS

| | | | |
|---|---|---|---|
| WO | 2008/002412 | A1 | 1/2008 |
| WO | 2008/002413 | A2 | 1/2008 |
| WO | 2008/002414 | A2 | 1/2008 |
| WO | 2008/036142 | A1 | 3/2008 |
| WO | 2008/091274 | A2 | 7/2008 |
| WO | 2008/091275 | A2 | 7/2008 |

OTHER PUBLICATIONS

M2E Power, Inc., Mobile Power Generation Solutions, "The company's patent-pending M2E™ solution has the potential to fundamentally transform the manner in which mobile devices are powered," http://www.m2epower.com/technology/overview.htm/, printed Apr. 8, 2008, 3 pgs.

Glynne-Jones, P., et al., "An electromagnetic, vibration-powered generator for intelligent sensor systems," 2003 Elsevier B.V., www.elsevier.com/locate/sna, doi: 10.1016/j.sna.2003.09.045, pp. 344-349.

Poulin, G., et al., "Generation of electrical energy for portable devices; Comparative study of an electromagnetic and a piezoelectric system," 2004 Elsevier B.V., www.elsevier.com/locate/sna doi: 10.1016/j.sna.2004.05.013, pp. 461-471.

Amirtharajah, Rajeevan, et al., "Circuits for Energy Harvesting Sensor Signal Processing," DAC 2006, Jul. 24-28, 2006, San Francisco, CA, pp. 639-644.

Ottman, Geffrey K., "Adaptive Piezoelectric Energy Harvesting Circuit for Wireless Remote Power Supply," IEEE Transactions on Power Electronics, vol. 17, No. 5, Sep. 2002, pp. 669-676.

Cao, Xinping, et al., "Electromagnetic Energy Harvesting Circuit With Feedforward and Feedback DC-DC PWM Boost Converter for Vibration Power Generator System," IEEE Transactions on Power Electronics, vol. 22, No. 2, Mar. 2007, pp. 679-685.

Shenck, Nathan S., et al., "Energy Scavenging with Shoe-Mounted Piezoelectrics," 2001 IEEE, pp. 30-42.

Ching, Neil N. H., et al., "PCB Integrated Micro-Generator for Wireless Systems," Department of Automation and Computer-Aided Engineering and Department of Computer Science and Engineering, The Chinese University of Hong Kong, 6 pgs.

Beeby, S. P., "Design, Fabrication and Simulations of Microelectromagnetic Vibration-Powered Generator for Low Power MEMS," University of Southampton, School of Electronics and Computer Science, Southampton SO17 1BJ, UK, Tyndall National Institute, Prospect Row, Cork, Ireland, DTIP of MEMS & MOEMS, Montreux, Switzerland, Jun. 1-3, 2005, 6 pgs.

Amirtharajah, Rajeevan, et al., "Self-Powered Signal Processing Using Vibration-Based Power Generation," IEEE Journal of Solid-State Circuits, vol. 33, No. 5, May 1998, pp. 687-695.

Mitcheson, P. D., et al., "Analysis of Optimized Micro-Generator Architectures for Self-Powered Ubiquitous Computers," Department of Electrical and Electronic Engineering, Imperial College of Science Technology and Medicine, Exhibition Road, London, SW7 2BT, 3 pgs.

Laithwaite, E. R., "Linear Induction Motors," Imperial College of Science and Technology, London, pp. 309-311.

Meninger, Scott, et al., "Vibration-to-Electric Energy Conversion," IEEE Transactions on Very Large Scale Integration (VLSI) Systems, vol. 9, No. 1, Feb. 2001, pp. 64-76.

Stevens, S., et al., "A Brief Overview of Power Generating Micro Electromechanical Systems," ESAT, div. ELECTA, K. U. Leuven, Kasteelpark Arenberg 10, B-3001 Heverlee, Belgium, pp. 1-7.

Mitcheson, P. D., et al., "MEMS Electrostatic Micropower Generator for Low Frequency Operation," Department of Electrical and Electronic Engineering, Imperial College London, London, UK, 2004 Elsevier B.V., www.elsevier.com/locate/sna, pp. 2-8.

Lee, Johnny M. H., et al., "Development of an AA size Energy Transducer with Micro Resonators," Centre for Micro and Nano systems, Dept. of Automation and Computer-Aided Engineering, Dept. of Computer Science and Engineering, The Chinese University of Hong Kong, Shatin, N.T., Hong Kong SAR, 4 pgs.

Gadre, Dhananjay V., "Kinetic Remote Control," Make, vol. 12 (technology magazine), http://www.make-digital.com/make/vol12/?pm=2&z=fw&pvieww=1268&zin=208&ul=texterity&sub_id..., printed Apr. 15, 2008, 4 pgs.

Mitcheson, Paul D., "Architectures for Vibration-Driven Micropower Generators," Journal of Microelectromechanical Systems, vol. 13, No. 3, Jun. 2004, pp. 429-440.

* cited by examiner

US 7,847,421 B2

SYSTEM FOR GENERATING ELECTRICAL ENERGY FROM AMBIENT MOTION

RELATED APPLICATIONS

This application claims priority to U.S. Provisional Patent Application No. 60/881,325, entitled "AMBIENT POWERED ELECTRICAL GENERATOR" and filed on Jan. 19, 2007, which is incorporated herein by reference in its entirety.

TECHNICAL FIELD

This disclosure relates generally to electrical generators. More specifically, this disclosure relates to a system to convert multiaxial ambient movement to electrical energy.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
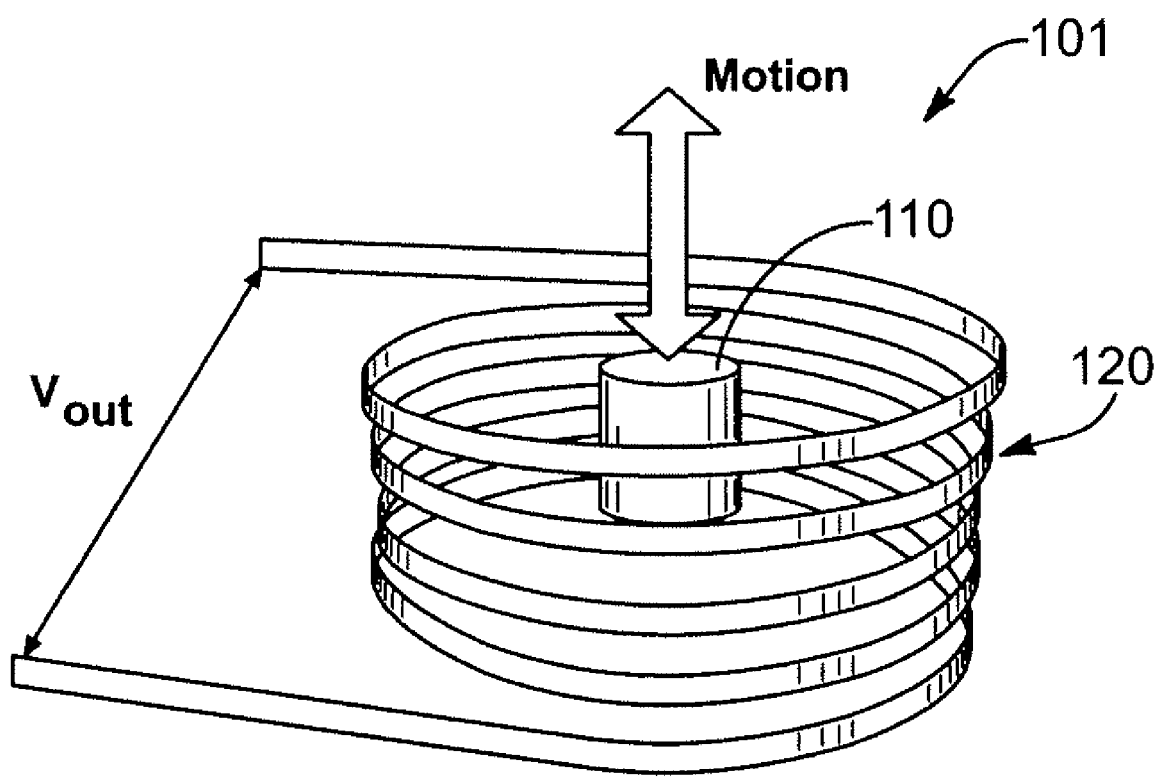
FIG. 1 depicts a perspective view of an embodiment of a linear motion electric power generator comprising a magnetic mass moving in a linear fashion relative to a coil.

A variety of portable devices electronic devices require electrical power to operate. Cellular telephones, personal digital assistant (PDA) devices, mp3 and other portable music players, and toys are common devices requiring electrical power. Often portable mechanical applications, such as automobiles, require electrical power as well. Typically batteries are used to provide the electrical energy to power these portable devices, and the need to change or charge batteries does not limit the usefulness or effectiveness of the device.

Charging and changing batteries, however, is expensive and can be a hassle. Increasing time between charging and/or changing would be a desirable improvement. Moreover, many situations preclude or limit the ability to change or charge batteries, thus limiting the useful life of the device to the duration of the batteries. Military field operations, space exploration, wilderness camping, emergency situations involving power outage, intracorporeal medical devices, and animal tracking devices are such limiting situations where spare batteries are not readily available and charging batteries is difficult or impossible. Intracorporeal medical devices and animal tracking devices are further limiting in that the size and/or weight of the batteries must be minimized.

The disclosed invention attempts to address these limitations, and also decrease the frequency with which charging and/or changing batteries is necessary, by harvesting energy from customary motion of the device to generate electrical energy that may be used to power the device and charge the batteries.

Previous attempts to harvest ambient movement into electrical energy have largely failed to provide sufficient electrical energy to power anything but the smallest electronic devices. This is because ambient movements generally occur at lower frequencies, whereas efficient electrical power generation occurs at higher frequencies. What is needed is a system capable of harvesting the energy at multiple frequencies and converting it to electrical energy. Disclosed herein is a system that can harvest energy from movement at a plurality of frequencies and convert it to electrical energy. This is accomplished by having a resonating electrical generator tuned to a resonant frequency that effectively and efficiently generates electrical power, and by having one or more other stages that harvest kinetic energy from ambient motion at other frequencies and store the energy as potential energy. The stored potential energy can be periodically released to the resonating electrical generator to creating a resonant oscillation of the generator, thereby increasing the amount of electrical energy that may be produced.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

FIG. 1 depicts an embodiment of a linear resonating electrical generator 101 comprising a magnet 110 moving in a linear fashion relative to a coil 120. The magnet 110 generates a magnetic field and the coil 120 is within the magnetic field. The magnet 110 may be configured to move in a linear fashion as indicated by the arrows. The movement of the magnetic field with respect to the coil 120 generates a current in the coil 120. The current creates a voltage Vout across two ends of the coil 120. Movement of the magnet 110 may be caused in numerous ways. As an example, the magnet 110 may be suspended by a spring and any ambient motion may result in an oscillation of the magnet 110. In another embodiment, the magnet 110 and coil 120 may be disposed within a housing and the magnet 110 may be configured to freely move back and forth within the coil 120 in response to a user shaking the housing. In another embodiment, the magnet 110 may be fixed while the coil 120 freely moves in the housing with respect to the coil 120.

The embodiment depicted in FIG. 1 may have a configuration that may allow multiaxial movement of the magnet 110 with respect to the coil 120. However, there may not be current generation by movement in all directions. Supposing that the arrows in FIG. 1 correspond with a direction along an axis y, movement along an axis x or an axis z may produce little or no current. The embodiment also may have a single resonant frequency and would rely on ambient movements along the y axis at or near that resonant frequency to generate electrical energy.

Figure 2:
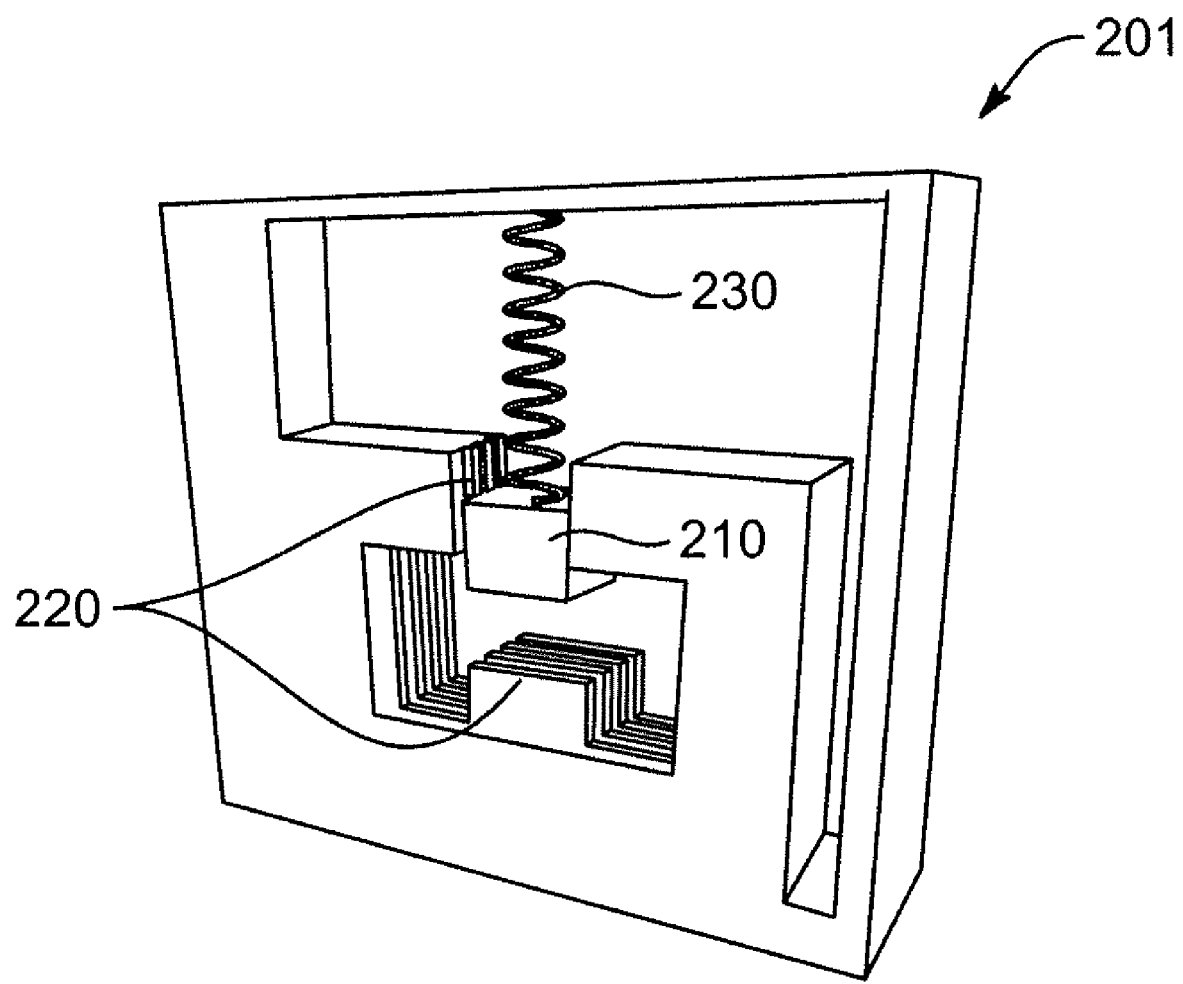
FIG. 2 depicts a perspective view of one embodiment of a multiaxial motion electric power generator.

FIG. 2 depicts one embodiment of a multiaxial resonating electrical generator 201 comprising a magnet 210 suspended by a biasing element 230, wherein the magnet 210 is disposed proximate to a coil 220. The biasing element 230 may be a spring, as depicted in FIG. 2. The biasing element 230 may be configured and tuned to have a resonant oscillation that corresponds to common ambient movement, thereby increasing the likelihood that a common ambient movement of the multiaxial motion electric generator may translate into oscillation of the biasing element 230. As before, movement of the magnet 210 with respect to the coil 220 produces an electric current in the coil 220.

As depicted, the embodiment in FIG. 2 may be configured to allow multiaxial movement of the magnet 210. Suppose that movement in a direction in line with the spring biasing element 230, such that the spring compresses and decompresses, corresponds with an axis y. For example, the spring biasing element 230 may cause the magnet 210 to oscillate in a bouncing, or linear fashion. There may also be movement along an axis x and an axis z. For example, the oscillation of the magnet 210 may be similar to a swinging action of a pendulum, the spring biasing element 230 causing the magnet 210 to swing in an arc. As depicted, movement along the x axis may be limited or eliminated entirely. As with FIG. 1, the embodiment depicted in FIG. 2 has a single resonant frequency, and must rely on ambient movements at or near that resonant frequency to efficiently generate electrical energy. The coil 220 may be sensitive to any movement of the magnet which is at right angles to any of windings of the coil 220. Movement along the x axis may be constrained, but similar in sensitivity to motions along the y and z axes.

The embodiments depicted in FIGS. 1 and 2 may have a single resonant frequency at which electrical energy may be generated effectively. Efficient electrical energy generation generally occurs at high frequencies. However, ambient motion generally occurs at low frequencies. The variance between the frequency of ambient movement and the frequency for efficient electrical energy generation renders this embodiment less than ideal. What is needed is a system to harvest energy from low frequency ambient motion, which then uses that energy to drive a high frequency resonant electrical generator.

Figure 3:
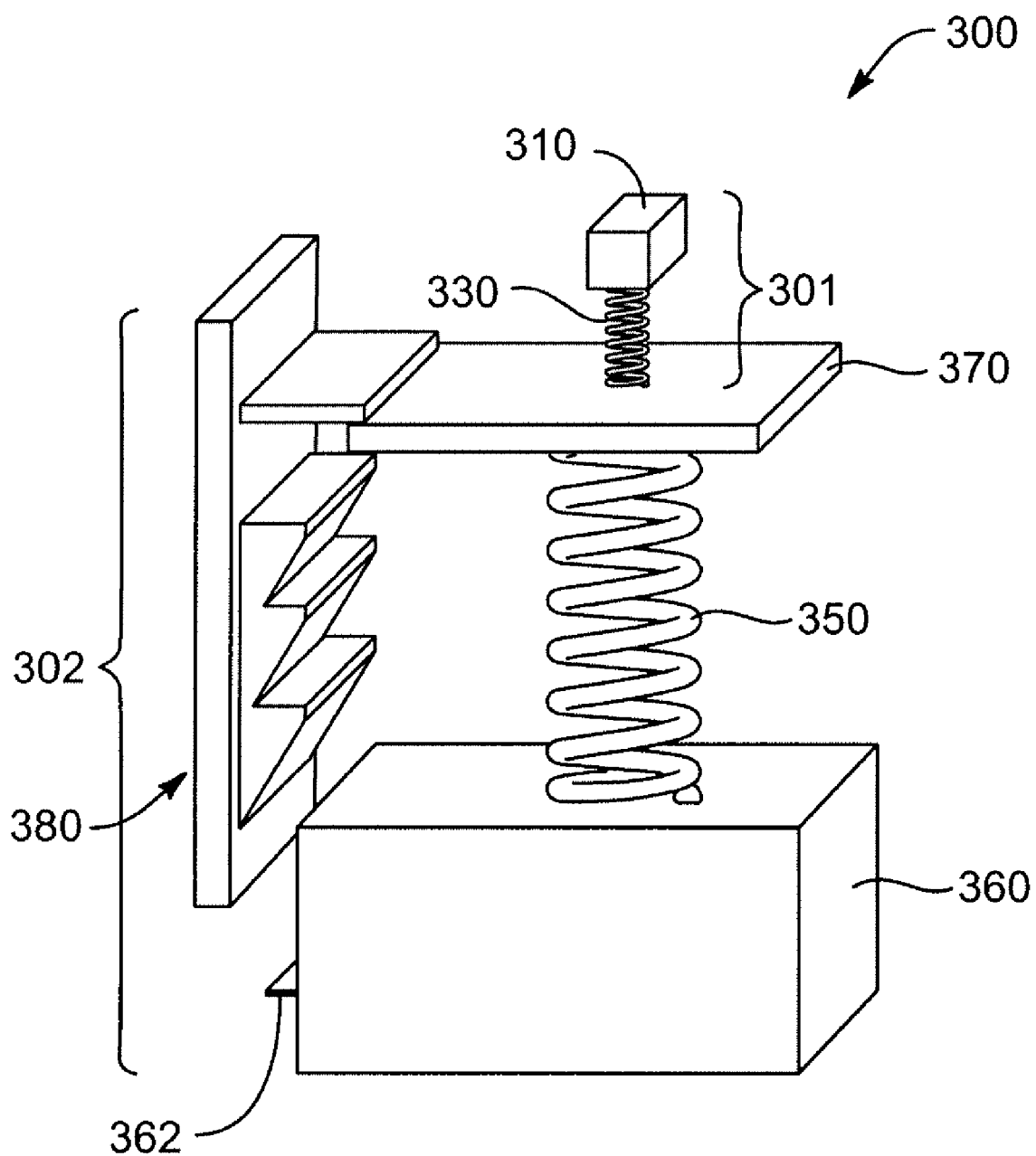
FIG. 3 depicts a perspective view of one embodiment of a system for generating electrical energy from multiaxial ambient motion.

FIG. 3 depicts one embodiment of a system 300 for generating electrical power from multiaxial ambient motion. The embodiment may comprise a resonating electrical generator 301 and a kinetic energy conversion system 302. The resonating electrical generator 301 may be considered a primary stage, or part of a primary stage, and the kinetic energy conversion system 302 may be considered a supplementary stage, or part of a supplementary stage. The primary stage may be capable of producing electricity in response to motion, independent of the supplementary stage. The supplementary stage may be configured to store energy and periodically release the stored energy to the primary stage to increase generation of electrical energy.

Although in a simplistic form, FIG. 3 depicts basic components of one embodiment of the disclosure. The resonating electrical generator 301 may comprise a biasing element 330 and a magnet 310. The biasing element 330 may be tuned such that the magnet 310 oscillates at a resonant frequency that corresponds to typical, common ambient movement and that efficiently produces electrical energy. The magnet 310 is in proximity to a coil (not depicted) such that the oscillation of the magnet 310 relative to the coil generates a current within the coil.

The kinetic energy conversion system 302 may be coupled to the resonating electrical generator 301 to convert kinetic energy and store it as potential energy that can periodically be released. The released stored potential energy may be used to generate a resonant oscillation to supplement ongoing multiaxial ambient motion to drive the generator 301.

The kinetic energy conversion system 302 may comprise a driving mass 360, a ratcheting mechanism 380, and a biasing element 350 to store potential energy. The driving mass 360 may be configured to move in response to ambient motion. The movement may be as simple as a shift due to inertia. The movement may not be actual movement, but rather movement relative to the biasing element 350 in response to ambient motion. Movement of the driving mass 360 may convert kinetic energy to stored potential energy by loading the biasing element 350. Loading the biasing element 350 may mean displacing the biasing element 350 from a resting position to a tension position and holding it in a tension position, thereby loading it with stored potential energy.

The ratcheting mechanism 380 may load the biasing element 350 by preventing the driving mass 360 from shifting back in response to the biasing element 350 moving in the direction of its resting position. Thereby, the ratcheting mechanism 380 and the driving mass 360 hold the biasing element 350 in a tension position, thus storing potential energy. The biasing element 350 may be tuned to have a resonant frequency that is different from the resonant frequency of the biasing element 330 of the resonating electrical generator 301. By tuning the biasing element 350 to a different resonant frequency, the range of frequencies of ambient movement from which electrical energy can be harvested is increased.

In another embodiment, the ratcheting mechanism 380 may hold the biasing element 350 in a tension position without engaging the driving mass 360. For example, a locked platform 370 may be moved along in one direction by the driving mass 360. The ratcheting mechanism 380 may prevent the locked platform 370 from reversing direction, thereby holding the biasing element 350 in a tension position. (See FIGS. 6A-6C).

Figure 4A:
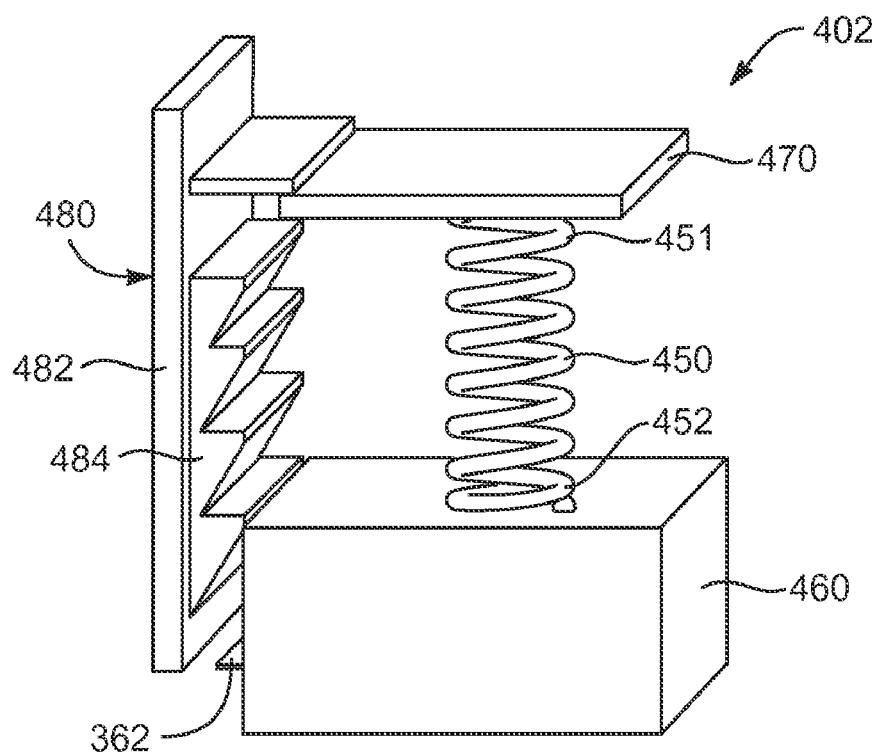
FIG. 4A depicts a perspective view of an embodiment of a kinetic energy conversion system.
Figure 4B:
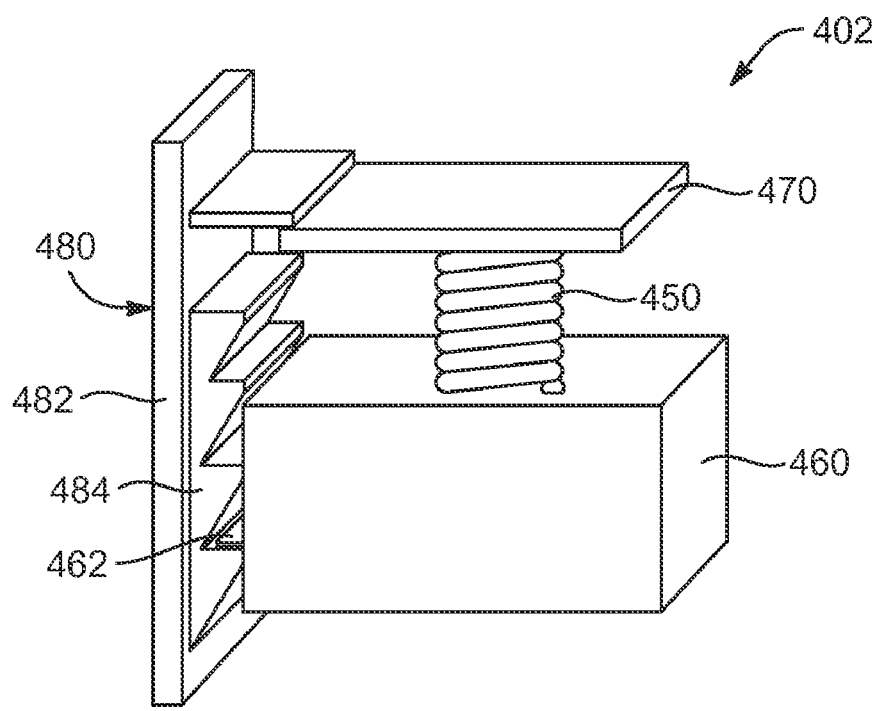
FIG. 4B depicts another a perspective view of the kinetic energy conversion system of FIG. 4A.

FIGS. 4A and 4B depict one embodiment of a kinetic energy conversion system 402 by itself, without the resonating electrical generator 301 depicted in FIG. 3. In one embodiment, the biasing element 450 may be a spring, as depicted in FIGS. 4A and 4B. The spring biasing element 450 may be displaced from a resting position to a tension position by a driving mass 460 either compressing or stretching the spring biasing element 450. In another embodiment, the biasing element 450 may be formed of resilient material. In another embodiment, the biasing element 450 may be one of a torsion shaft or a coil spring that stores potential energy upon winding or twisting.

A locked platform 470 may secure the biasing element 450 to enable loading the biasing element 450, displacing it from a resting position to a tension position. As depicted in FIGS. 4A and 4B, the spring biasing element 450 may comprise a fixed end 451 and a free end 452. The driving mass 460 may be coupled to the free end 452 of the spring biasing element 450. The locked platform 470 may secure the fixed end 451 such that the driving mass 460 either compresses or stretches the spring biasing element 450 by pushing or pulling the free end, respectively. The locked platform 470 may be configured to periodically release and thereby release any stored potential energy in the biasing element 450.

The kinetic energy conversion system 402 may further comprise a ratcheting mechanism 480 that may be configured to engage the driving mass 460. The ratcheting mechanism 480 may comprise a ratchet face 482 with teeth 484 to engage the driving mass 460. The teeth 484 may be configured to allow the driving mass 460 to shift in one direction while preventing it from shifting back in the opposite direction. Suppose the driving mass 460 moves along an axis y to compress or stretch the spring biasing element 450. The teeth 484 of the ratcheting mechanism 480 may allow the driving mass 460 to move up the y axis, and prevent the driving mass 460 from moving back down the y axis. The driving mass 460 may be free to move along an axis x or along an axis z, but energy is only harvested from movement along the y axis. In another embodiment, a housing (not shown) may prevent movement of the driving mass 460 along the x axis or the z axis. In yet another embodiment, multiple kinetic energy conversion systems 402 may be incorporated and configured to harvest energy from movement in a plurality of directions.

The driving mass 460 may further comprise a flange 462 to engage the teeth 484 of the ratcheting mechanism 480. The flange 462 may protrude near the teeth 484 of the ratcheting mechanism 480 and thereby enable the teeth 484 to better engage the driving mass 460.

FIG. 4B depicts a compressed spring biasing element 450 after the driving mass 460 has shifted in response to ambient movement. The teeth 484 of the biasing element are shown engaged with the flange 462 and prevent the driving mass 460 from reversing direction, thereby holding the biasing element 450 in a tension position storing potential energy. The embodiment may further comprise a release mechanism (not shown) that may release the ratcheting mechanism 480 allowing the biasing element 450 to release the stored potential energy. The release mechanism may release the locked platform 470, or may release the flange 462 of the driving mass 460. The released energy may be used to create a resonant oscillation of the first stage, or a resonant oscillation of the resonant electrical generator 301 (as depicted in FIG. 3) to increase generation of electrical energy.

Figure 5A:
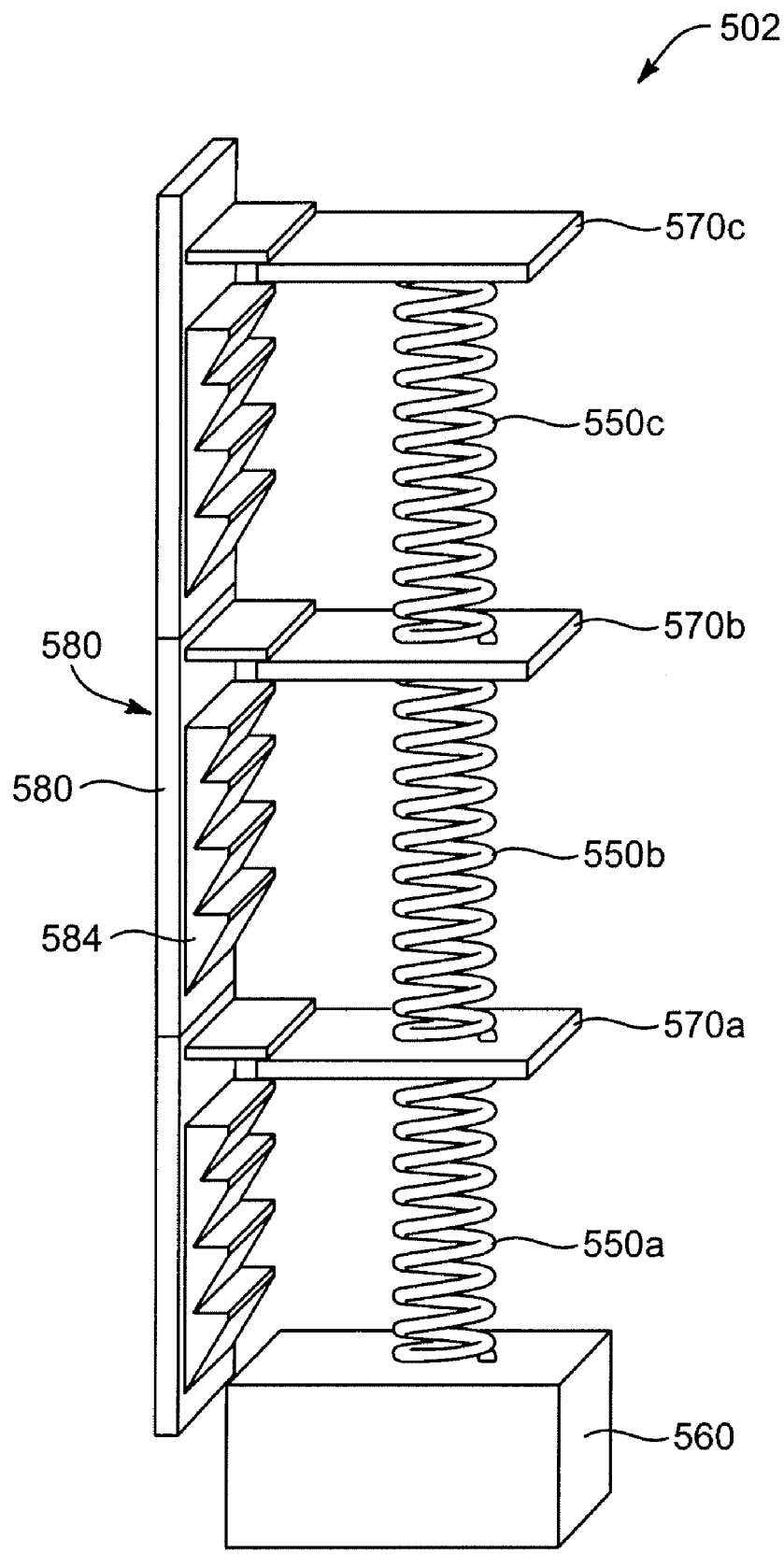
FIG. 5A depicts a perspective view of another embodiment of a kinetic energy conversion system.
Figure 5B:
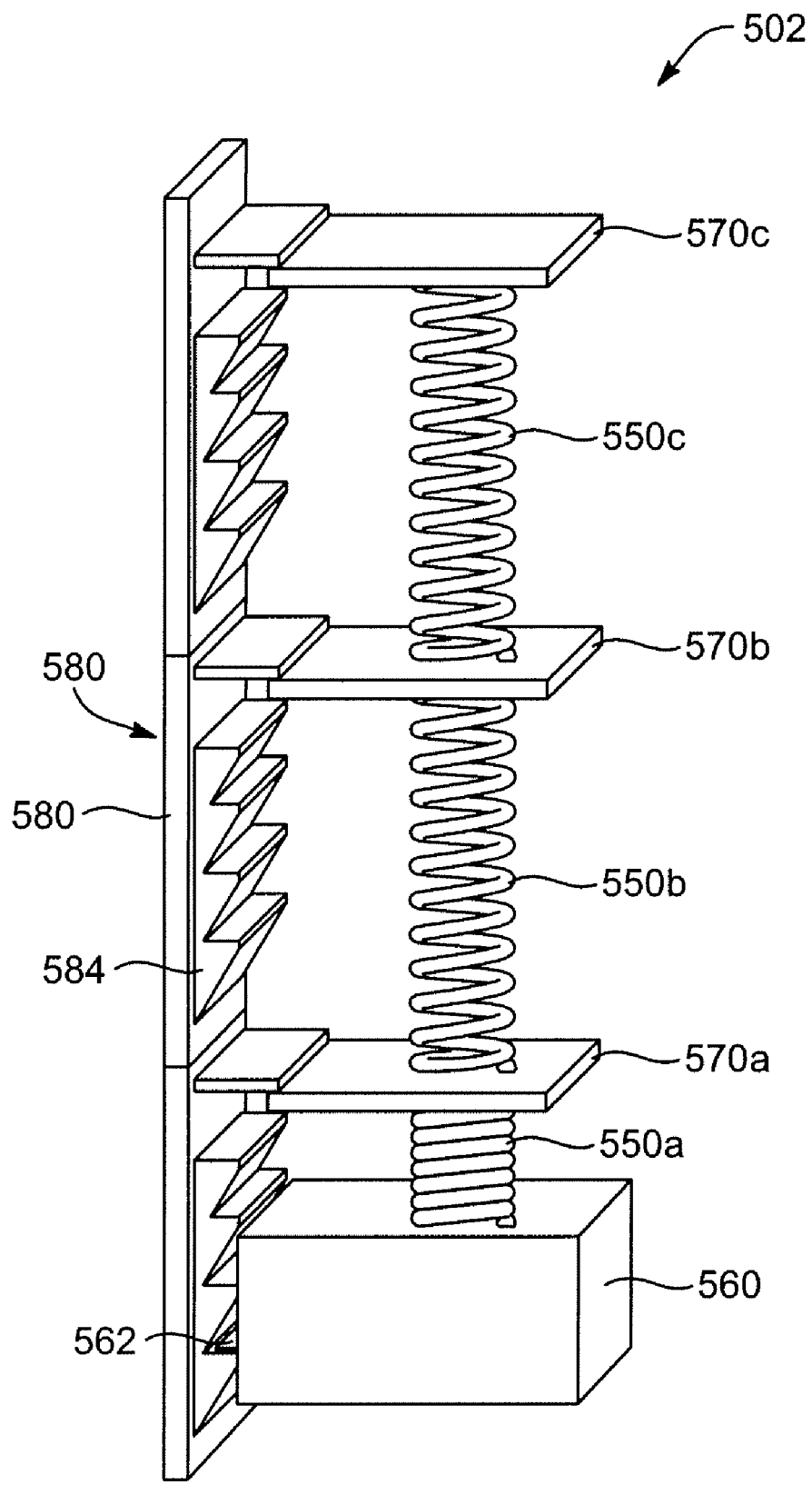
FIG. 5B depicts a perspective view of another embodiment of a kinetic energy conversion system.
Figure 5C:
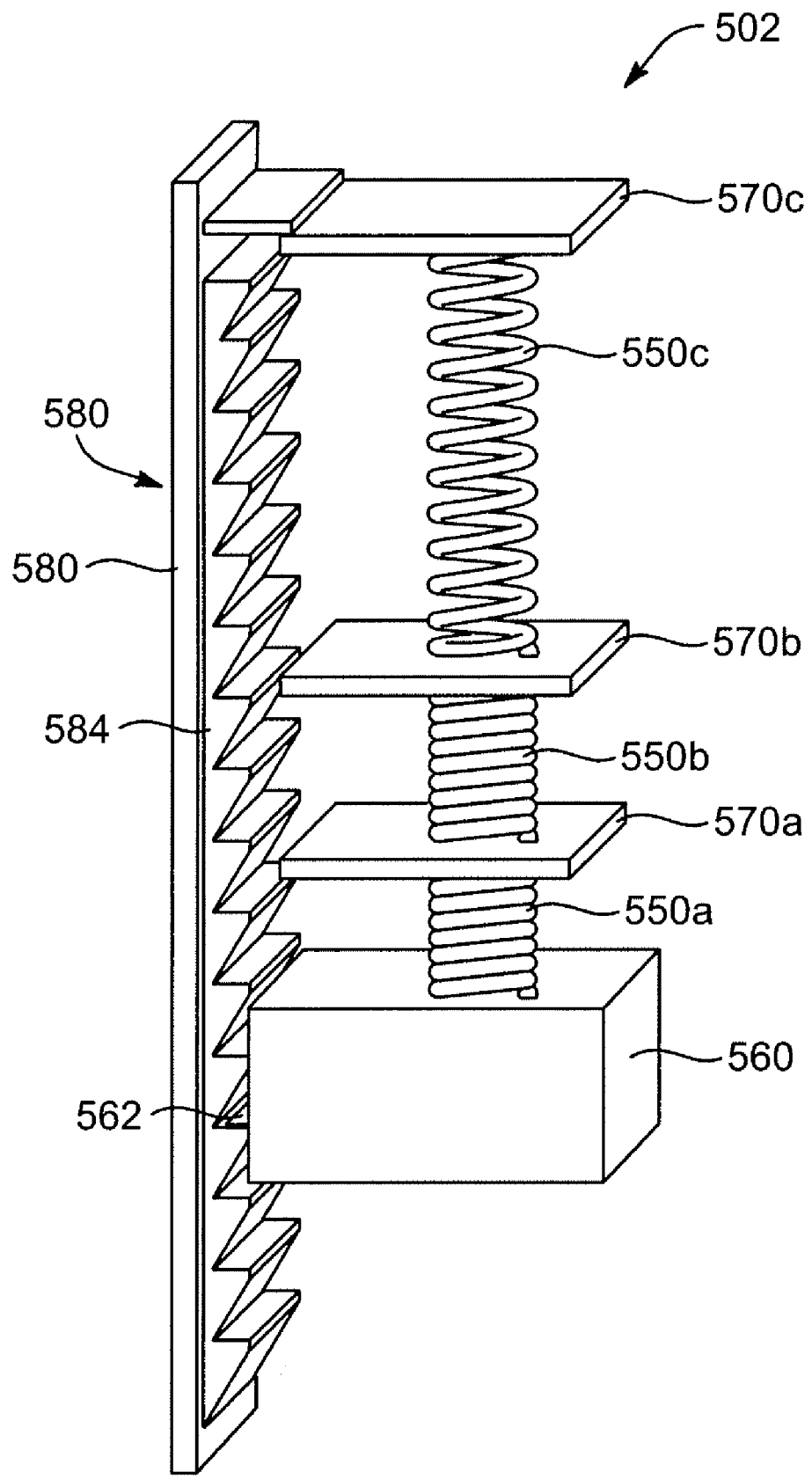
FIG. 5C depicts a perspective view of another embodiment of a kinetic energy conversion system.

FIGS. 5A, 5B, and 5C depict a perspective view of another embodiment of a kinetic energy conversion system 502 having a plurality of biasing elements 550. As shown, the biasing elements 550 may be springs. The spring biasing elements 550 may be sequentially displaced from a resting position to a tension position by a driving mass 560 that compresses or stretches each. In another embodiment, one or more of the plurality biasing elements 550 may be formed of a resilient material. In another embodiment, the biasing elements 550 may be one of a torsion shaft, a torsion spring, or a coil spring that stores potential energy upon winding or twisting.

The embodiment may further comprise a ratcheting mechanism 580 to allow the driving mass 560 to move in one direction while preventing it from moving back the opposite direction. The ratcheting mechanism 580 may comprise a ratchet face 582 supporting teeth 584. As explained above, the driving mass 560 may move along an axis y to compress or stretch the biasing elements 550. The teeth 584 of the ratcheting mechanism 580 may allow the driving mass 560 to move up the y axis and prevent the driving mass 560 from moving back down the y axis. The driving mass 560 may be free to move along an axis x or along an axis z, but energy is only harvested from movement along the y axis. In another embodiment, a housing (not shown) may prevent movement of the driving mass along the x axis or the z axis.

A plurality of locked platforms 570 may secure one end of the corresponding biasing elements 550 to enable displacing each from a resting position to a position of tension. The plurality of locked platforms 570 may be configured to enable sequential loading of each biasing element 550. Similar to the embodiment depicted in FIGS. 4A and 4B, the spring biasing elements 550 may comprise a fixed end and a free end. The driving mass 560 may be coupled to the free end of a first spring biasing element 550*a*. A first locked platform 570*a* may secure the fixed end of the first biasing element 550*a* in a manner such that the driving mass 560 either compresses or stretches the first biasing element 550*a* by pushing or pulling the free end, respectively.

In another embodiment, the kinetic energy conversion system 502 may further comprise a ratcheting mechanism 580 that may be configured to allow the driving mass 560 to drive the locked platforms 570 along the teeth 584, yet the teeth 584 may never engage the driving mass 560.

FIG. 5B depicts the embodiment of the kinetic energy conversion system 502 of FIG. 5A with the first biasing element 550*a* compressed. The flange 562 of the driving mass 560 is engaged with the teeth 584 of the ratcheting face 582, whereby the ratcheting mechanism 580 prevents the driving mass from moving in a direction opposite the direction moved to compress the first biasing element 550*a*, thereby holding the first biasing element 550*a* in a tension position storing potential energy.

Once the first biasing element 550*a* is loaded, the first locked platform 570*a* may be configured to enable sequential loading of a second biasing element 550*b* by maintaining the first biasing element 550*a* in the position of tension while the driving mass 560 either compresses or stretches the second biasing element 550*b*. In one embodiment, the first locked platform 570*a* may couple to the driving mass and unlock. Thus, the first locked platform 570*a*, the loaded first biasing element 550a, and the driving mass 560 may be coupled as a single moving part that can move the second biasing element 550b to a position of tension, loading it with potential energy.

A second locked platform 570b may secure the fixed end of the second biasing element 550b in a manner such that the driving mass either compresses or stretches the second biasing element 550b by pushing or pulling the free end of the second biasing element 550b, respectively. The first locked platform 570a may facilitate sequential loading of the second biasing element 550b by coupling to the driving mass 560 once a level of displacement of the first biasing element 550a has been achieved. In this manner, the first loaded biasing element 550a and the driving mass 560 may be coupled together as a single moving piece to then displace the second biasing element 550b.

FIG. 5C depicts the embodiment of the kinetic energy conversion system 502 of FIGS. 5A and 5B with the first biasing element 550a and the second biasing element 550b compressed. The flange 562 of the driving mass 560 is engaged with the teeth 584 of the ratcheting face 582, whereby the ratcheting mechanism 580 prevents the driving mass from moving in a direction opposite the direction moved to compress the first biasing element 550a and the second biasing element 550b, thereby holding the first biasing element 550a and the second biasing element 550b in a tension position storing potential energy.

A third biasing element 550c may be sequentially loaded similar to loading of the second biasing element 550b. The second locked platform 570b may engage the first locked platform 570a and the driving mass 560, once a level of displacement of the second biasing element 550b has been achieved. Any number of biasing elements may be sequentially loaded in this manner.

When all of the biasing elements 550 have been loaded, the kinetic energy conversion system 502 may release the stored potential energy. The kinetic energy conversion system 502 may further comprise a release mechanism (not shown). The locked platforms 570 may be configured to unlock simultaneously to allow the biasing elements 550 to simultaneously release the respective stored potential energy in each. The release mechanism may also disengage the driving mass 560 from the ratcheting mechanism 580 to allow it to return to its original position to repeat the process of loading the biasing elements 550.

In another embodiment, the release mechanism may simultaneously release the locked platforms 570 and the driving mass 560, thereby allowing the biasing elements 550 to release the stored potential energy. The driving mass 560 may be forced back toward the position where it started the loading process and contact the first stage, or the resonant electrical generator, to generate a resonant oscillation of the first stage, or the resonant electrical generator.

Figure 5D:
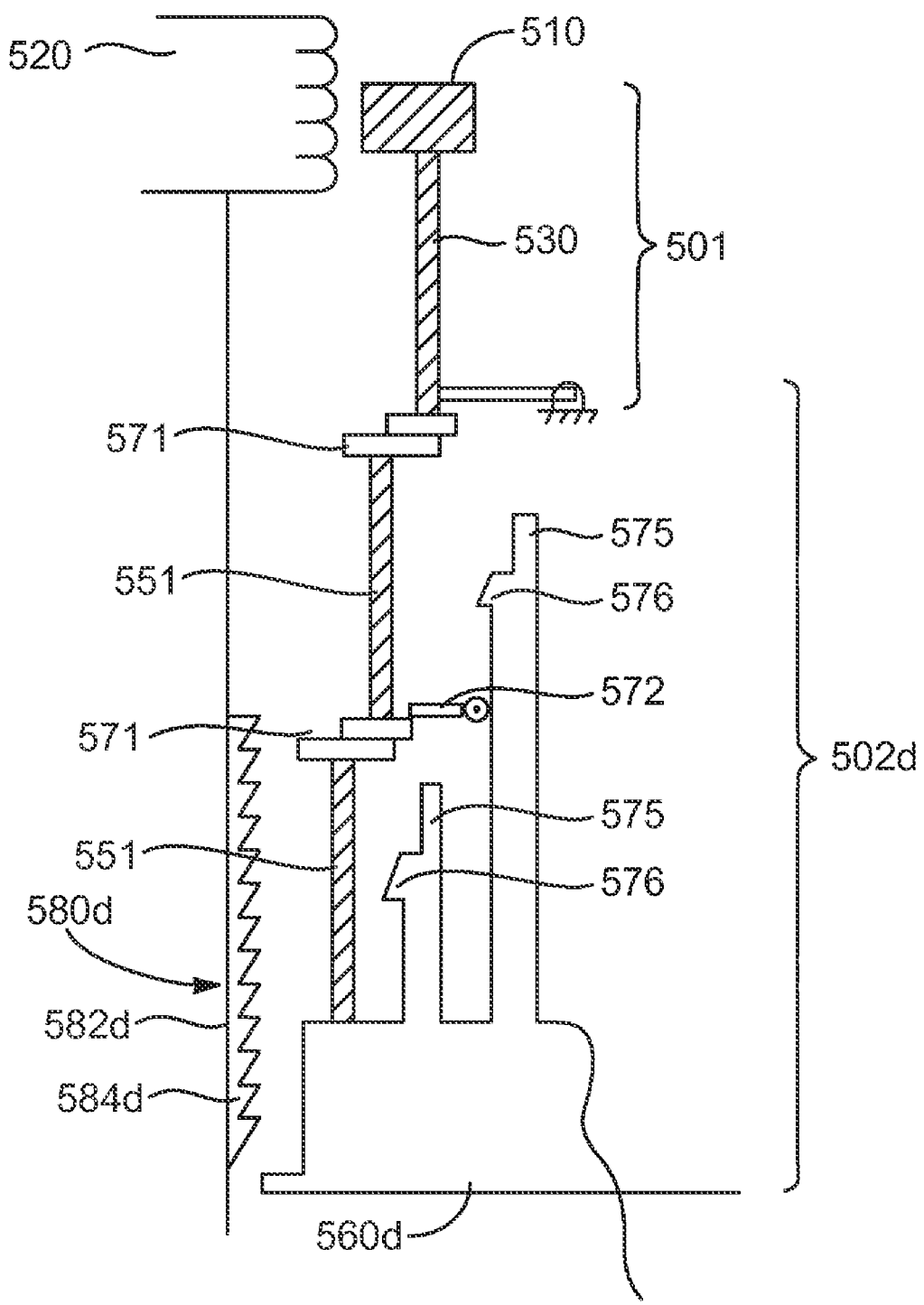
FIG. 5D depicts a side elevation view of one embodiment of a system for generating electrical energy from ambient motion.

FIG. 5D depicts a side elevation view of one embodiment of a system 500 for generating electrical energy from ambient motion. The embodiment 500 may comprise a first stage 501 comprising a multiaxial resonating electrical generator and second stage 502d comprising a kinetic energy conversion system.

The kinetic energy conversion system 502d may be similar to previously mentioned embodiments. The embodiment 502d depicted is similar to the embodiment depicted in FIGS. 5A-5C. The embodiment comprises a ratcheting mechanism 580d to allow a driving mass 560d to move in one direction while preventing it from moving back the opposite direction. The ratcheting mechanism 580d may comprise a ratchet face 582d supporting teeth 584d. The teeth 584d of the ratcheting mechanism 580d may allow the driving mass 560d to move up the y axis, and prevent the driving mass 560 from moving back down the y axis.

The embodiment may further comprise a plurality of fixed pivot arms 572 to engage and secure the corresponding locked platforms 571. The driving mass 560d may further comprise fingers 575 to release a corresponding fixed pivot arm 572. The fingers 575 may further comprise a finger lock 576 to engage the corresponding locked platform 571 when the corresponding biasing element 551 is fully loaded. The finger locks 576 may hold loaded biasing elements 551 in a loaded position while subsequent biasing elements 551 are loaded. Once a first biasing element 551 is fully loaded, the driving mass 560d may sequentially load a second biasing element 551. Any number of biasing elements 551 may be loaded sequentially in this manner. After all the biasing elements 551 are fully loaded, all the finger locks 576 simultaneously release to allow the biasing elements 551 to release stored potential energy. The released energy generates a resonant oscillation of the resonating electrical generator 501.

The resonating electrical generator may comprise a magnet 510 coupled to a biasing element 530. As depicted in FIG. 5D, the biasing element 530 may comprise a spring. The magnet 510 generates a magnetic field. The magnet 510 is disposed proximate to a coil 520 such that the coil is within the magnetic field. The resonant oscillation generated by the kinetic energy conversion system 502d releasing stored energy causes the magnet 510 to oscillate relative to the coil 520 and thereby cause the magnetic field to move relative to the coil 520. The movement of the magnetic field relative to the coil 520 generates an electrical current within the coil.

Figure 6A:
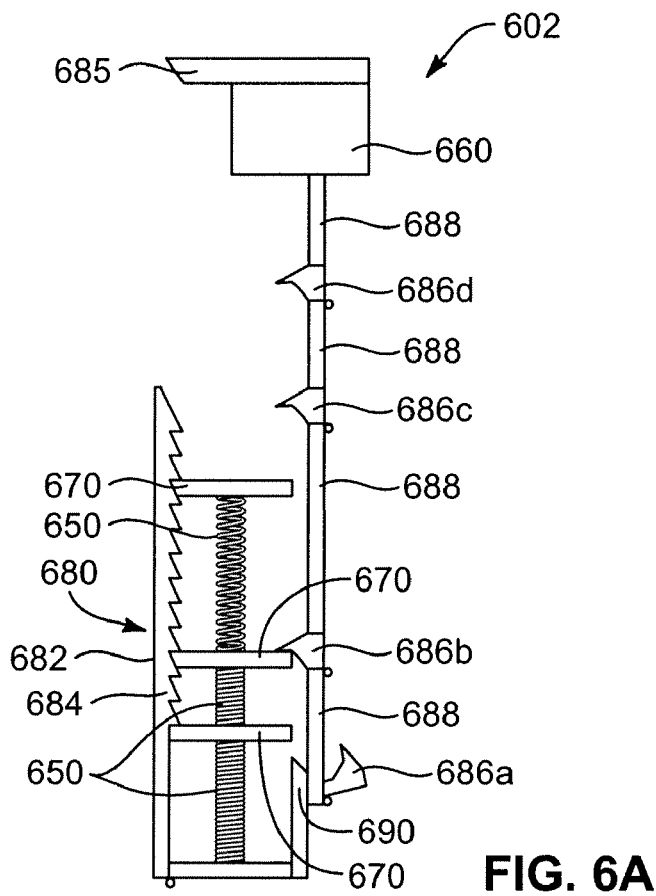
FIG. 6A depicts a side elevation view of another embodiment of a kinetic energy conversion system.
Figure 6B:
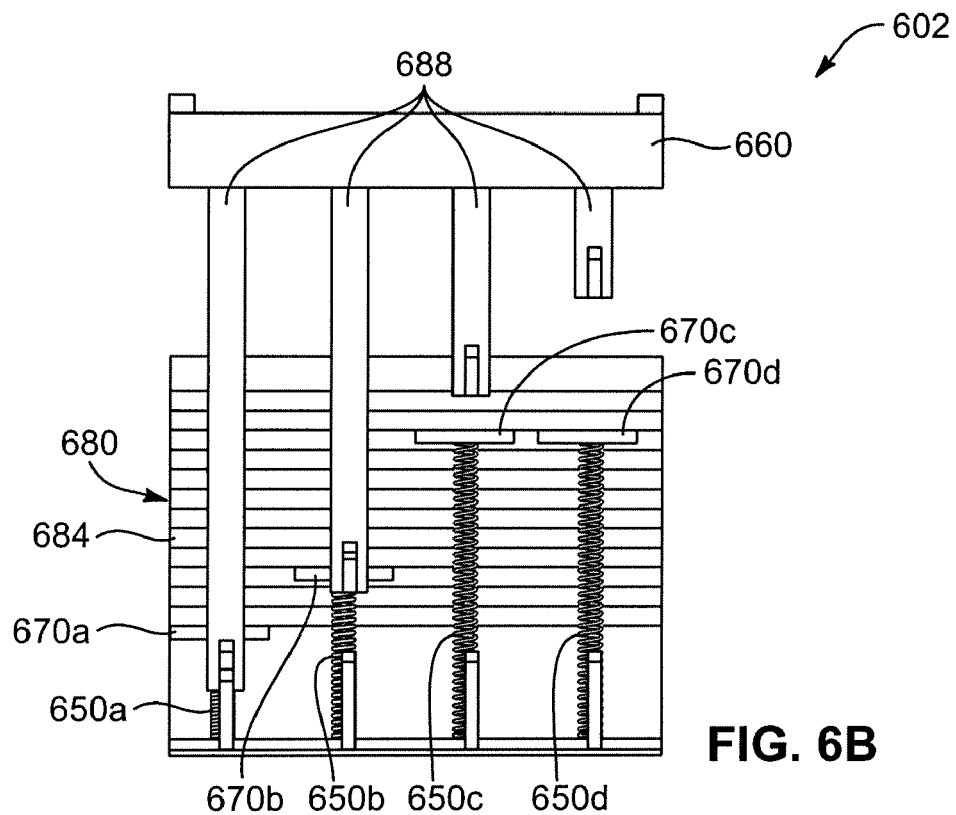
FIG. 6B depicts a front elevation view of the embodiment of a kinetic energy conversion system of FIG. 6A.
Figure 6C:
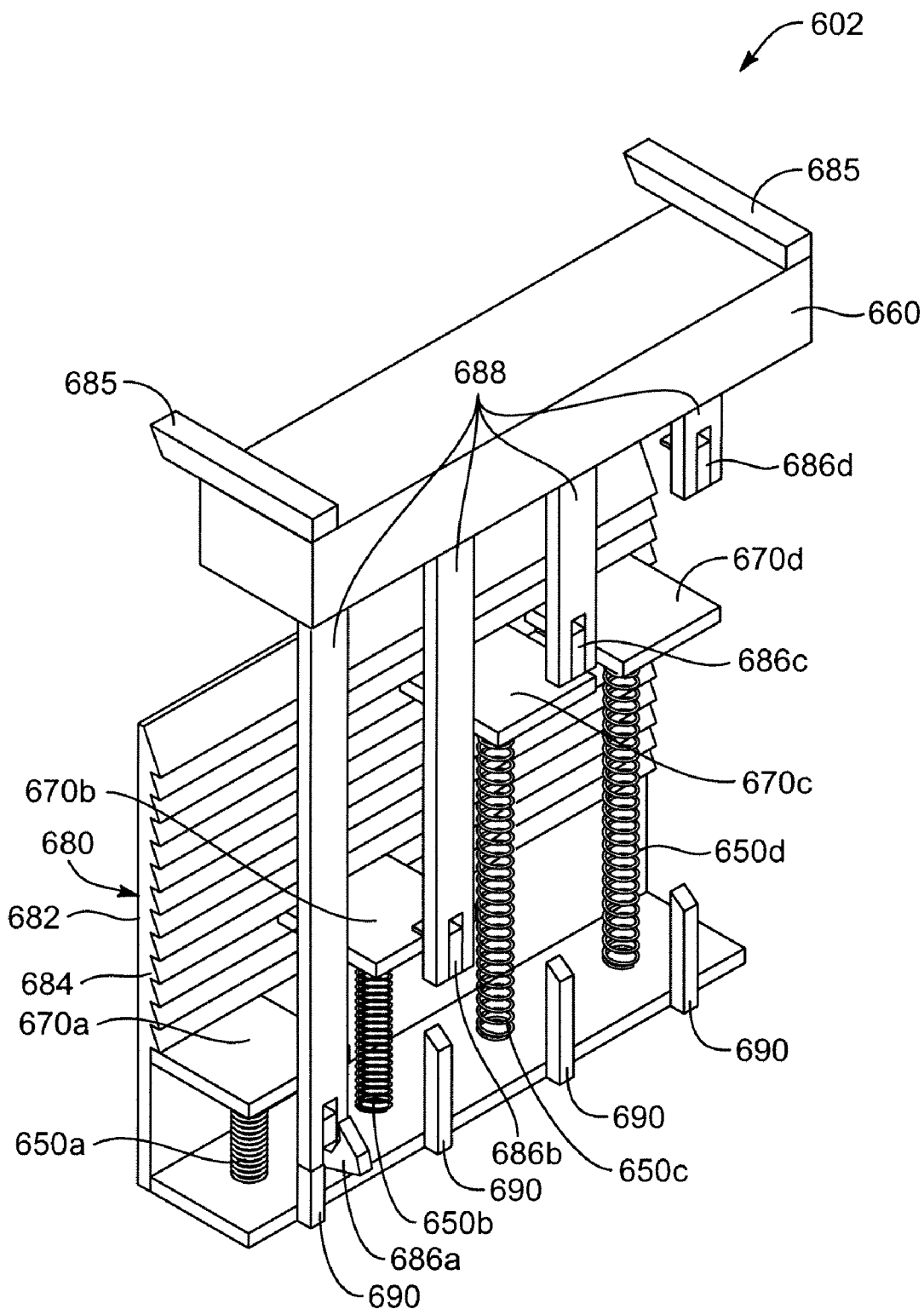
FIG. 6C depicts a perspective view of the embodiment of a kinetic energy conversion system of FIG. 6A.

FIGS. 6A-6C depict another embodiment of a kinetic energy conversion system 602 having a plurality of biasing elements 650, in parallel, to store kinetic energy converted to potential energy. FIG. 6A depicts a side elevation view of the embodiment. FIG. 6B depicts a front elevation view of the same embodiment. FIG. 6C depicts a perspective view of the same embodiment. As shown in FIGS. 6A-6C, the biasing elements 650 may be springs. The spring biasing elements 650 may be sequentially displaced from a resting position to a tension position by a driving mass 660 that compresses or stretches each. In another embodiment, one or more of the plurality of biasing elements 650 may be formed of a resilient material. In another embodiment, the biasing elements 650 may be one of a torsion shaft, a torsion spring, or a coil spring that stores potential energy upon winding or twisting.

The driving mass 660 may move along an axis y to compress or stretch the biasing elements 650. The driving mass 660 may be free to move in either direction along the y axis, exerting force on the biasing elements on, for example, the down stroke. The driving mass 660 may also be free to move along an axis x or along an axis z, but energy may be harvested only from movement along the y axis. In another embodiment, a housing (not shown) may prevent movement of the driving mass along the x axis or the z axis. In still another embodiment, a plurality of driving masses (not shown) may be configured to harvest energy from movement in a plurality of directions, translating that energy to a force that may displace the biasing elements 650 and thereby store potential energy.

A plurality of locked platforms 670 may be coupled to one end of the corresponding biasing elements 650 to enable displacing the biasing elements from a resting position to a position of tension. A second end of the biasing elements 650 may be fixed. The plurality of locked platforms 670 may be configured to enable sequential loading of each of the biasing elements 650.

The kinetic energy conversion system 602 may further comprise a ratcheting mechanism 680 that may be configured to enable the driving mass 660 to drive the locked platforms 670 and thereby exert force on the biasing elements 650. The ratcheting mechanism may couple to the locked platforms and the driving mass, whereby the driving mass exerts a force through the ratcheting mechanism 680 to the locked platforms 670, and on to the biasing elements 650.

The ratcheting mechanism may comprise a ratchet face 682 that supports teeth 684. The ratcheting face 682 and teeth 684 may be integrally formed to comprise a single component. The teeth 684 of the ratcheting mechanism 680 may allow the locked platforms to move in one direction along an axis y, and prevent the locked platforms from moving in an opposite direction along the y axis.

The ratcheting mechanism may further comprise a plurality of driving pawls 686 configured to engage a corresponding locked platform 670. A plurality of linked arms 688 may be coupled to corresponding driving pawls 686 and coupled to the driving mass 660. The linked arms 688 may be configured to sequentially load the plurality of biasing elements 650. For example, as depicted in FIGS. 6B and 6C, the linked arms 688 may be of differing lengths such that the corresponding driving pawls 686 engage the plurality of locked platforms 670 one at a time. A disengaging mechanism 690 may be configured to disengage a driving pawl 686 from a corresponding locked platform 670 once the corresponding biasing element 650 is fully loaded.

FIGS. 6B and 6C depict the embodiment of the kinetic energy conversion system 602 of FIG. 6A with the first biasing element 650a compressed. The first driving pawl 686a is shown disengaged from locked platform 670a. The locked platform 670a is engaged with the teeth 684 of the ratchet face 682 to hold the first biasing element 650a in a tension position storing potential energy. A second driving pawl 686b is engaged with locked platform 670b, thereby driving locked platform 670b to compress biasing element 650a. The remaining driving pawls 686c and 686d are yet to engage the corresponding locked platforms 670. Once the second biasing element 650b is loaded, the disengaging mechanism 690 may disengage the driving pawl 686b from the locked platform 670b. Driving pawl 686c will then engage locked platform 670c and begin loading biasing element 650c. Any number of biasing elements 650 may be sequentially loaded in this manner.

When all of the biasing elements 650 have been loaded, the kinetic energy conversion system 602 may release the stored potential energy. The kinetic energy conversion system 502 may further comprise a release mechanism 685 to simultaneously release all of the locked platforms 670. The locked platforms 670 may be configured to release simultaneously to allow the biasing elements 650 to simultaneously release the respective stored potential energy in each. For example, as depicted in FIGS. 6A and 6C, the release mechanism may be configured to displace the ratchet face 682, to thereby disengage the teeth 684 from the locked platforms 670. When all the biasing elements 650 are loaded, the last driving pawl 686d may disengage from the locked platform 670d. The driving mass 660 may then continue to drop, thereby allowing the release mechanism 685 to displace the ratchet face 682. As shown in FIGS. 6A and 6C, the release mechanism 685 may comprise a trigger to displace the ratchet mechanism 680 by causing it to pivot away from the locking platforms 670, thereby disengaging the teeth 684 and the locking platforms 670 and allowing the biasing elements 650 to release stored potential energy.

Figure 6D:
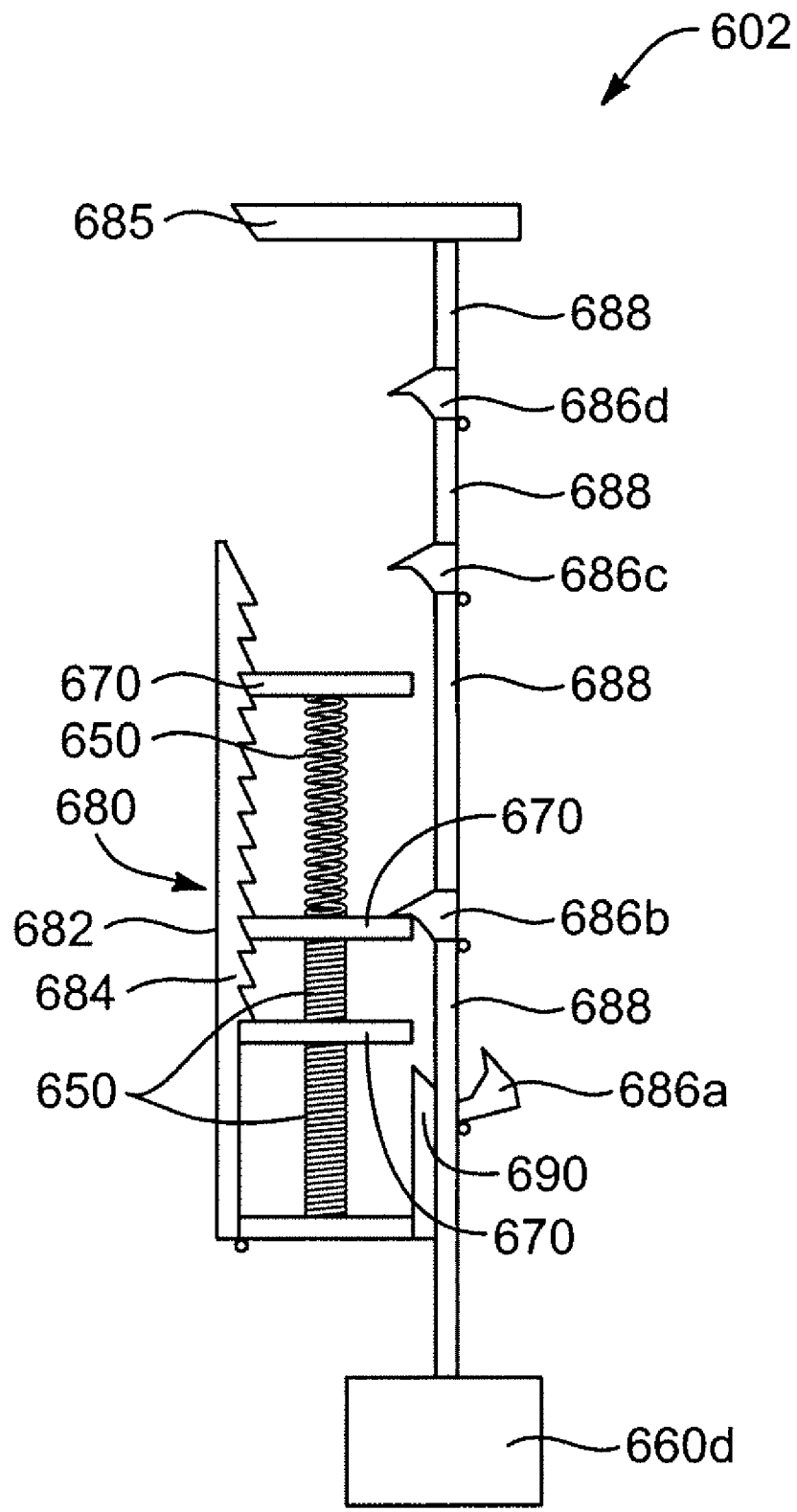
FIG. 6D depicts a side elevation view of another embodiment of a kinetic energy conversion system.

FIG. 6D depicts a side elevation view of another embodiment of a kinetic energy conversion system 602. The embodiment is similar to the embodiment of FIGS. 6A-6C, but with a different configuration for the driving mass 660d.

The same basic concept of FIGS. 6A-6D may be applied to a pendulum actuated rotating gear to load multiple compression springs or torsion springs. The basic configuration of a pendulum actuated rotating gear embodiment is explained in conjunction with the next figures.

Figure 7A:
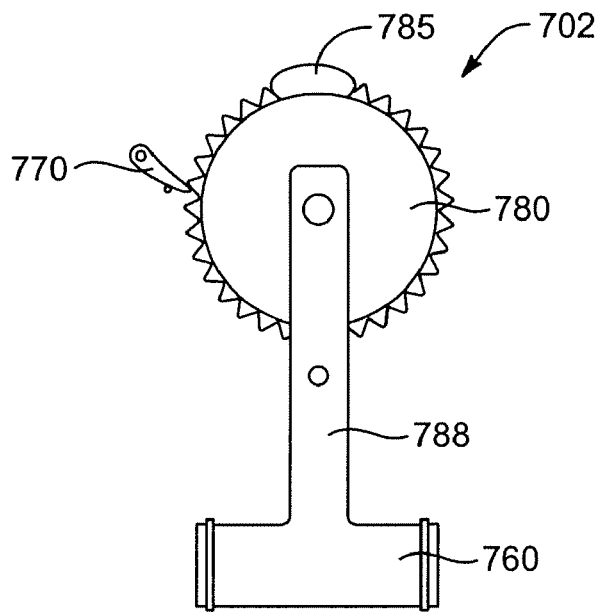
FIG. 7A depicts a front elevation view of another embodiment of a kinetic energy conversion system.

FIG. 7A depicts a front elevation view of another embodiment of a kinetic energy conversion system 702 comprising a pendulum 760 configured to rotate a ratchet gear 780 as it swings and thereby load a biasing element (not shown) to store potential energy. The pendulum 760 may be coupled to a pendulum lever 788. The pendulum lever 788 may be configured to cause the pendulum to swing about the same axis around which the ratcheting gear rotates. The pendulum lever 788 and the pendulum 760 may be optimized for specific loads. For example, the center of mass may be optimized to be sensitive to typical ambient movement. The embodiment may further comprise a pawl 770 which may allow rotation of the gear 780 in only one direction, a loading direction. The embodiment may further comprise a cam 785 which may be coupled to the ratchet gear 780 to cause the pawl 770 to temporarily disengage. The pawl 770 may be reset to engage the biasing element 750 after the potential energy is fully released. In another embodiment, the pawl 770 may be reset by a reset latch (not shown).

Figure 7B:
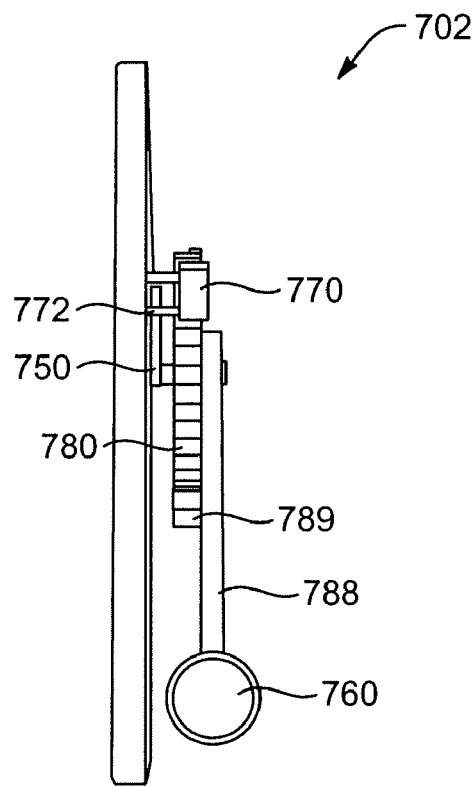
FIG. 7B depicts a side elevation view of the embodiment of a kinetic energy conversion system of FIG. 7A.

FIG. 7B depicts a side elevation view of the embodiment of a kinetic energy conversion system 702 of FIG. 7A. The perspective of this figure depicts the biasing element 750. The biasing element 750 may be a torsion spring. Displacement of the torsion spring to a plurality of tension positions may coincide with rotation of the ratchet gear 780. In one embodiment a first end of the torsion spring 750 may be secured to the ratchet gear 780, while a second end may be secured by a spur (not depicted) or a pawl stop not rotating with the ratchet gear 780.

Also depicted in FIG. 7B, a driving pawl 789 may be coupled to the pendulum lever 788 to engage and rotate the ratchet gear 780 as the pendulum 760 swings in one direction, the loading direction, while allowing the pendulum 760 and pendulum lever 788 to swing freely back in an opposite direction.

Figure 7C:
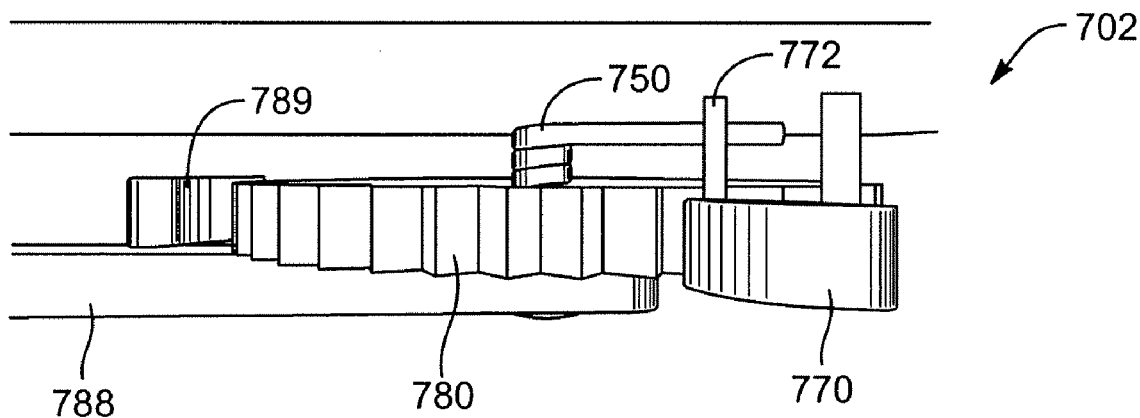
FIG. 7C depicts a close-up side elevation view of the embodiment of a kinetic energy conversion system of FIG. 7A.

FIG. 7C depicts a close-up side elevation view of the embodiment of a kinetic energy conversion system 702 of FIG. 7A. As depicted in FIG. 7C, the pawl 770 may further comprise a pawl stop 772, which is configured to engage another end, the second end of the torsion spring 750. As the ratchet gear 780 rotates, the free end of the torsion spring 750 engages the pawl stop 772 and is secured. With the free end secured, the secured end coupled to the ratchet gear is able to displace the torsion spring 750 to a tension position as the ratchet gear 780 rotates.

Figure 7D:
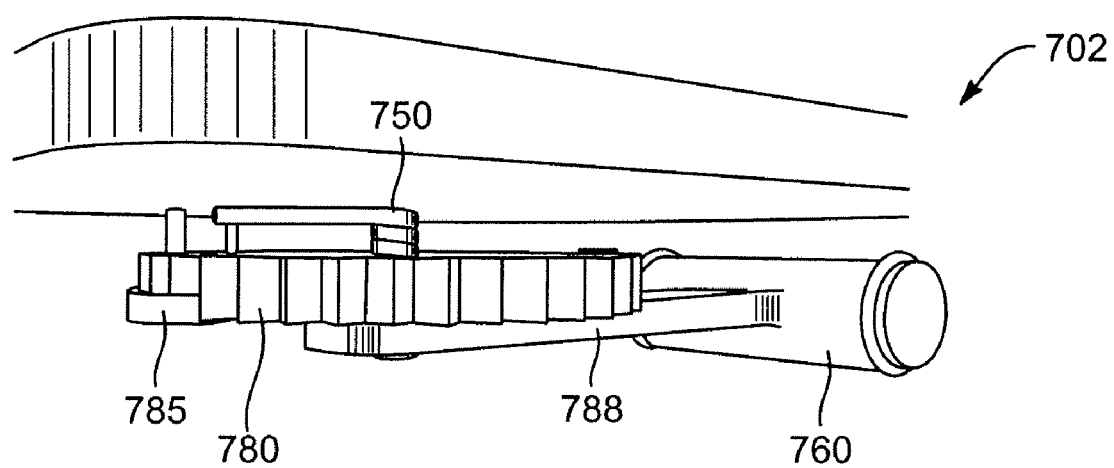
FIG. 7D depicts a top elevation view of the embodiment of a kinetic energy conversion system of FIG. 7A.

FIG. 7D depicts a top elevation view of the embodiment of a kinetic energy conversion system 702 of FIG. 7A. As depicted in FIG. 7D, the cam 785 coupled to the ratchet gear 780 eventually rotates far enough in the loading direction to temporarily displace the pawl 770, thereby displacing the pawl stop 772 and allowing the torsion spring 750 to release the stored potential energy. In another embodiment, the surface of the pawl stop 772 may be maintained in contact with the flat surface of the pawl 770 by the force of the torsion spring 750.

In another embodiment, the cam 785 may displace the pawl 770 past the point of being in contact with the end of the pawl stop 772. The pawl stop 772 may extend and thus prevent the pawl 770 from engaging the ratchet gear 780. The ratchet gear 780 may then be free to rotate in the direction opposite the loading position, the ratchet gear 780 being driven by the stored energy of the biasing element 750. The energy storage and release process may then be repeated by reversing the direction of the pawl stop 772 until it clears the pawl 770 and re-establishes the initial condition of the system 702.

Figure 8:
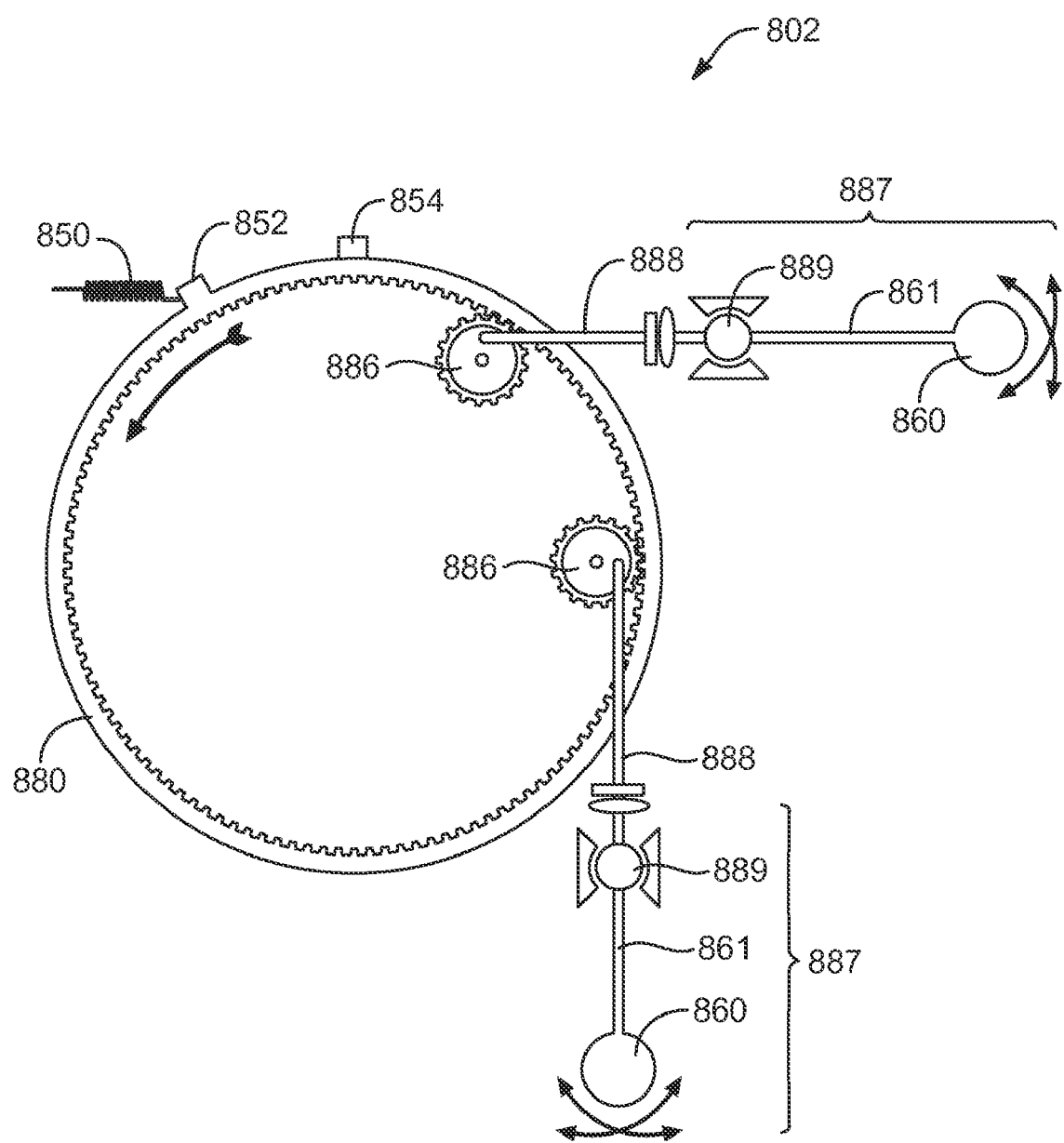
FIG. 8 depicts an embodiment of a multiaxial kinetic energy conversion system comprising a ring gear configured to displace a plurality of biasing elements as it rotates.

FIG. 8 depicts another embodiment of a multiaxial kinetic energy conversion system 802. The embodiment may comprise a ring gear 880 configured to rotate about a center axis and displace a plurality of biasing elements 850 to a plurality of tension positions storing increasing quantities of potential energy. The ring gear 880 may also be described as a planetary ring gear. The ring gear 880 may have gear teeth on the inside edge. The ring gear 880 may also have a plurality of spurs 852 protruding from the outer edge. The biasing elements 850 may be coupled to the spurs 852, as depicted in FIG. 8. The spurs 852 may also be configured to release energy to the primary phase, or to a resonant electrical generator, by striking other spurs on the primary phase, or the resonant electrical generator, when the stored potential energy is released.

The embodiment may further comprise a plurality of low frequency, multi-axial vibrating beam-spring mechanisms 887 rotating about a ball joint 889 in response to ambient motion. A multi-axial vibrating beam-spring mechanism 887 may comprise a driving mass 860 coupled to a free end of a cantilever beam 861. The cantilever beam-spring 887 may further comprise a ball joint 889 coupled at or near a fixed end of the cantilever beam 861. As is apparent from FIG. 8, the driving mass 860 may be free to move along two axes. The low frequency, multi-axial vibrating beam-spring mechanism may be tuned to have a natural frequency near the frequency of the primary driving force, such as the motion of a person or animal, the flight motion of a bird, or the vibration frequency of a vehicle, to name a few examples.

As depicted in FIG. 8, two low frequency, multi-axial vibrating beam-spring mechanisms 887 may be set at right angles to each other to ensure that at least one of the beams will have at least a partially horizontal orientation to the ground to thereby leverage the force of gravity. Motions along the axis of the cantilever beam 861 may not efficiently induce movement of the driving mass 860; at least not sufficient movement of the driving mass to displace the plurality of biasing elements 850.

Each multi-axial vibrating beam-spring mechanism 887 may be coupled to a cam interface 889. The vibrating beam-spring mechanism 887 may be configured to drive a corresponding piston 888 via the corresponding cam interface 889. The cam interface 889 may be a disk-type cam interface. The pistons 888, in turn, may drive a plurality of ratcheting gears 886, which in turn drive the ring gear 880 and displace the plurality of biasing elements 850.

The embodiment may be further configured to release the potential energy stored in the plurality of biasing elements 850. For example, the ratcheting gears 886 may periodically disengage from the ring gear 880. In another embodiment, the pistons 888 may release from the ratcheting gears 886. When the embodiment releases the potential energy from the plurality of biasing elements 850, the energy may be used to generate a resonant oscillation of a resonant electrical generator.

Any of the foregoing embodiments of a kinetic energy conversion system may be coupled to a resonant electrical generator. It will be apparent to one of skill in the art that such embodiments of a kinetic energy conversion system may effectively harvest energy from lower frequency ambient motion and use the stored energy to supplement resonant electrical energy generation.

Figure 9:
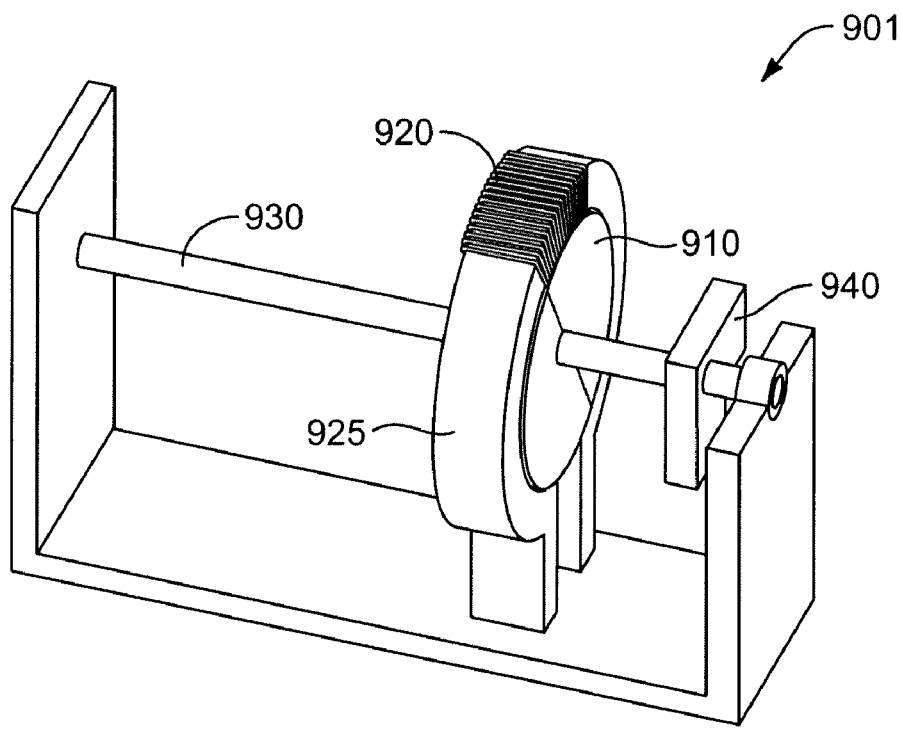
FIG. 9 depicts an embodiment of a resonating electrical generator.

FIG. 9 depicts an embodiment of a resonating electrical generator 901. The embodiment may comprise a diametrically poled magnet 910. The magnet 910 may be disk-shaped. The magnet 910 may be rotatably moveable within a core 925. A coil 920 may be wrapped around a portion of the core 925. The magnet 910 may be coupled to a biasing element 930 to enable a resonant oscillation of the magnet 910 relative to the coil 920. The magnet 910 generates a magnetic field and the magnet is positioned so that the coil 920 is within the magnetic field. The rotating movement of the magnetic field with respect to the coil 920 generates a current in the coil 920. The current creates a voltage across two ends of the coil, as depicted in FIG. 1.

As depicted in FIG. 9, the biasing element 930 may comprise a torsion shaft having a free end and a fixed end. The magnet 910 may be coupled to the torsion shaft 930 near the free end, thereby able to rotate in an oscillating fashion as the torsion shaft 930 twists in response to ambient motion. In another embodiment, the biasing element 930 may comprise a torsion spring, a coil spring, or other biasing element.

The embodiment shown in FIG. 9 may further comprise an offset mass 940 coupled to the torsion shaft 930 to increase twisting of the torsion shaft 930 in response to ambient motion. As the torsion shaft 930 twists, the magnet 910 rotates within the core 925 relative to the coil 920 and thereby generates a current in the coil 920. The offset mass 940 enables response to ambient movements in a vertical and a horizontal direction, making the resonating electrical generator 901 multiaxial. Movement along the axis of the torsion shaft 930 may not produce oscillation, and thus may not produce electrical energy in the coil.

Figure 10:
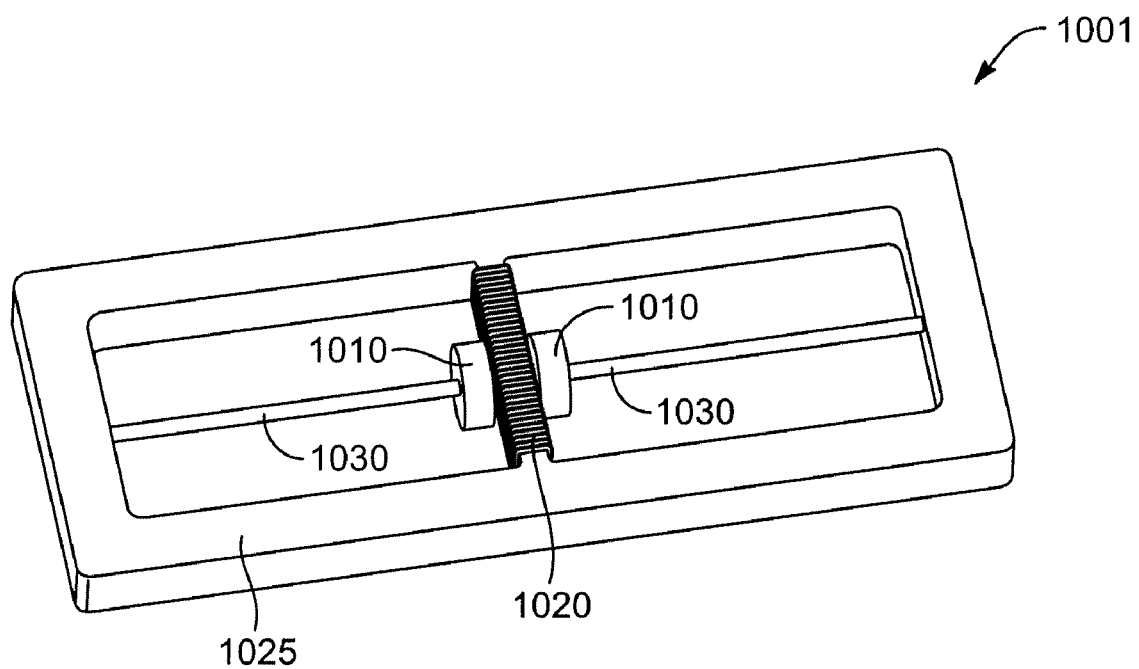
FIG. 10 depicts another embodiment of a resonating electrical generator.

FIG. 10 depicts another embodiment of a resonating electrical generator 1001. The embodiment may comprise a core 1025 having a central crossbar. A coil 1020 may be wrapped around the central crossbar of the core 1020. Two cantilever beams 1030 may be supported at a fixed end of each beam 1030 by the core 1025. To generate electricity, magnets 1010 may be suspended on a free end of each cantilever beam 1030. As depicted in FIG. 10, the embodiment may comprise multiple magnets 1010 positioned on different sides of the coil 1020 to generate a magnetic field in which the coil 1020 is positioned. The cantilever beams 1030 facilitate oscillation of the magnets 1010 in response to multiaxial ambient movement. The cantilever beams 1030 may be responsive to movement in a horizontal and a vertical direction. The oscillating motion of the magnets 1030 causes movement of a magnetic field relative to the coil 1020 and thereby generates an electric current within the coil 1020.

Figure 11:
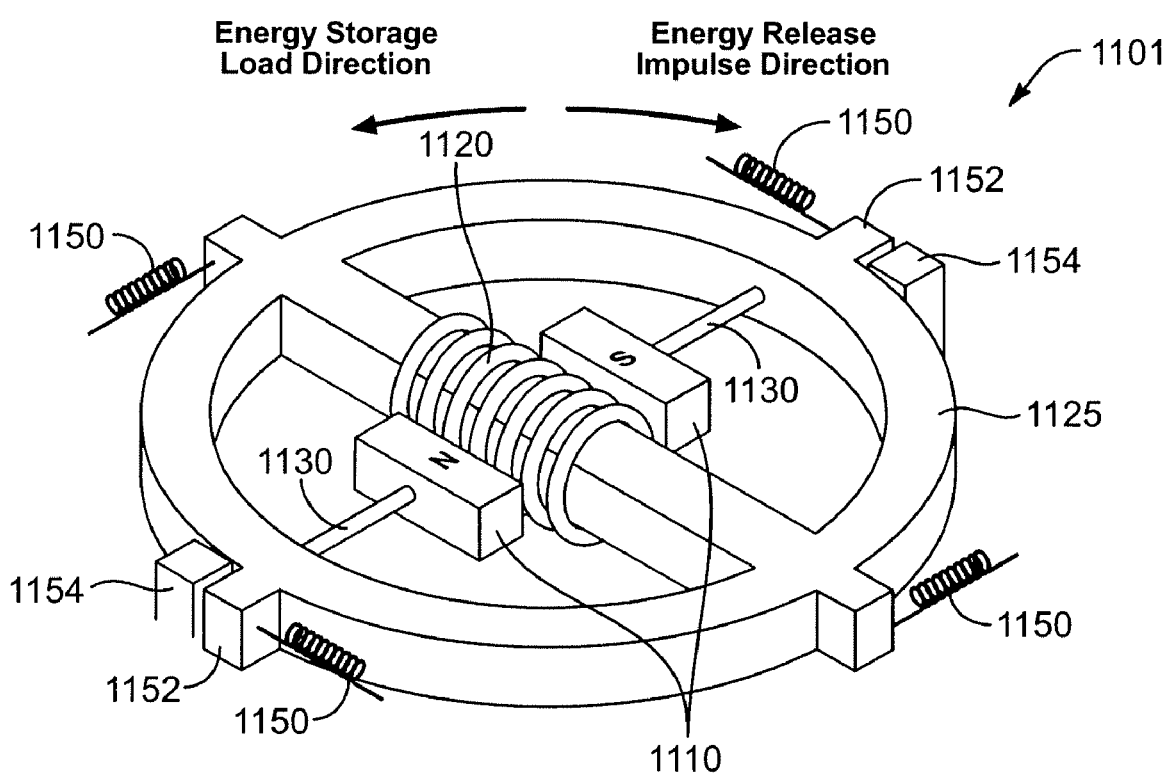
FIG. 11 depicts still another embodiment of a resonating electrical generator.

FIG. 11 depicts still another embodiment of a resonating electrical generator 1101. The embodiment may have a ring-shaped core 1125 with a central cross-bar and a coil 1120 wrapped around the central crossbar. The embodiment may further comprise two cantilever beams 1130 each supported at a fixed end by the core 1125. Magnets 1110 may be coupled to a free end of each cantilever beam 1130. The magnets 1110 may generate a magnetic field and positioned such that the coil 1120 is within the magnetic field. The magnets 1110 may be positioned on different sides of the coil 1120 to enhance the magnetic field within which the coil may be situated. Movement of the magnetic field relative to the coil 1120 produces electrical current within the coil 1120.

The core 1125 may be configured to rotate in response to ambient movement. For example, the core 1125 may be coupled to a torsion shaft as depicted in FIG. 10. In another embodiment, rotation of the core 1125 may be due to being coupled to a kinetic energy conversion system such as that depicted in FIG. 8. Rotation of the ring-shaped core 1125 may result in oscillations of the magnets 1130. In another embodiment, the kinetic energy conversion system of FIG. 8 may periodically and impulsively release stored potential energy that causes an oscillation of the core 1125. Both the rotating movement of the core 1125 and multiaxial ambient movement may result in oscillation of the magnets 1110 on the cantilever beams 1130. Movement of the magnets results in movement of the magnetic field relative to the coil 1120 and thereby generate an electric current within the coil 1120.

Figure 12A:
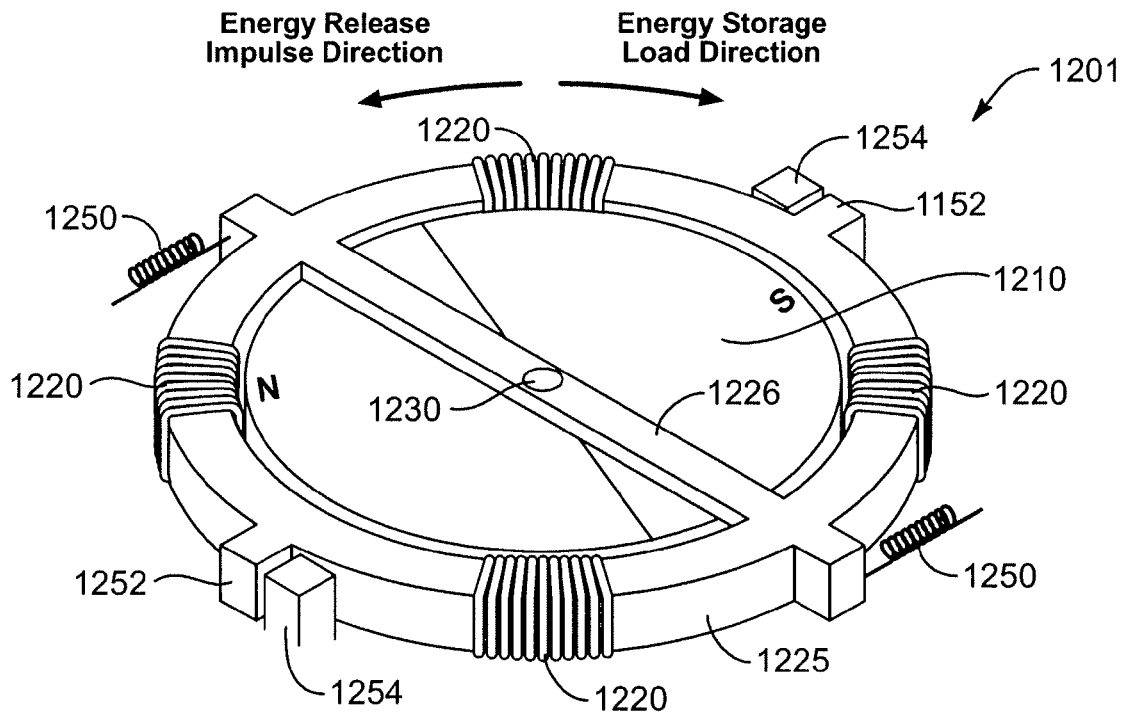
FIG. 12A depicts still another embodiment of a resonating electrical generator.

FIG. 12A depicts another embodiment of a resonating electrical generator 1201 having a ring-shaped core 1225. A plurality of coils 1220 may be wrapped around the ring of the core 1225. The embodiment may further comprise a supporting crossbar 1226 on the core 1225 to support a diametrically poled magnet 1230. The magnet 1230 may be configured to rotate about a central axis by a biasing element 1210 coupled to the supporting crossbar 1226 of the core 1225. The magnet 1230 may be rotatably moveable within the ring-shaped core 1225 in proximity to the plurality of coils 1220 such that the coils 1220 are within the magnetic field created by the magnet 1230. The magnet 1230 may be disk-shaped.

The biasing element may be a torsion spring or a coil spring. Ambient motion may generate rotational oscillation of the magnet 1230. Rotational oscillation of the magnet 1230 may result in movement of the magnetic field relative to the plurality of coils 1220 and thereby generate electrical current within the coils 1220.

Rotational oscillation of the magnet 1230 with respect to the coils 1220 may be produced in response to multiaxial ambient movement. Rotational oscillation may also be caused by a kinetic energy conversion system releasing stored energy to cause a resonant oscillation. As depicted in FIG. 12A, the ring shaped core may be coupled to a plurality of biasing elements 1250. The embodiment of FIG. 12A may be coupled to a kinetic energy conversion system such as the embodiment depicted in FIG. 8. The kinetic energy conversion system may ratchet the core 1225 and thereby displace the biasing elements 1250 to a tension position storing potential energy. When the kinetic energy conversion system releases the stored energy, it may generate a resonant oscillation of the ring-core and/or the magnet with respect to each other. The embodiment may further comprise spurs 1252 configured to contact fixed spurs 1254 to facilitate generation of the resonant oscillation.

Figure 12B:
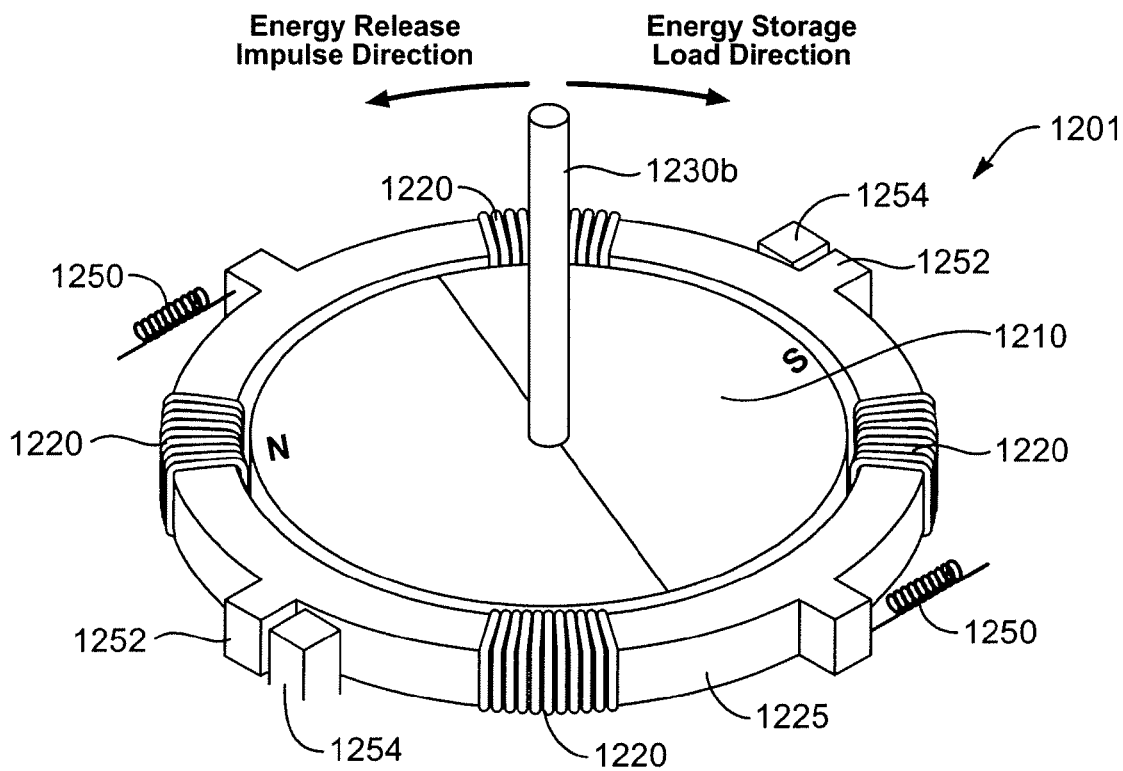
FIG. 12B depicts a still another embodiment of a resonating electrical generator.

FIG. 12B depicts yet another embodiment of a resonating electrical generator 1201b having a ring-shaped core 1225. The core may be the same core 1225 as depicted in FIG. 12A, but without a supporting crossbar 1226. As before, a plurality of coils 1220 may be wrapped around the ring of the core 1225. Similarly, the magnet 1230 may be configured to rotate about a central axis by a biasing element 1210b. The magnet 1230 may be rotatably moveable within the ring-shaped core 1225 in proximity to the plurality of coils 1220 such that the coils 1220 are within the magnetic field generated by the magnet 1230. The magnet 1230 may be disk-shaped.

As depicted in FIG. 12B, the biasing element 1210b may be a torsion shaft. The magnet 1230 may be couple to the torsion shaft 1210b and configured to rotate in the ring-shaped core 1225 as the torsion shaft 1210b twists. Rotation of the magnet 1230 may result in movement of the magnetic field relative to the plurality of coils 1220 and thereby generate electrical current within the coils 1220.

Rotational oscillation of the magnet 1230 with respect to the coils 1220 may be produced in response to multiaxial ambient movement. Rotational oscillation may also be caused by a kinetic energy conversion system releasing stored energy to cause a resonant oscillation. As depicted in FIG. 12B, the ring shaped core may be coupled to a plurality of biasing elements 1250. The embodiment of FIG. 12B may be coupled to a kinetic energy conversion system, such as the embodiment depicted in FIG. 8. The kinetic energy conversion system may ratchet the core 1225 and thereby displace the biasing elements 1250 to a tension position storing potential energy. When the kinetic energy conversion system releases the stored energy, it may generate a resonant oscillation of the ring-core and/or the magnet with respect to each other. The embodiment may further comprise spurs 1252 configured to contact fixed spurs 1254 to facilitate generation of the resonant oscillation. The fixed spurs may be coupled to the torsion shaft 1210b, such that striking the spurs generates a rotational resonant oscillation of magnet 1230.

Figure 13:
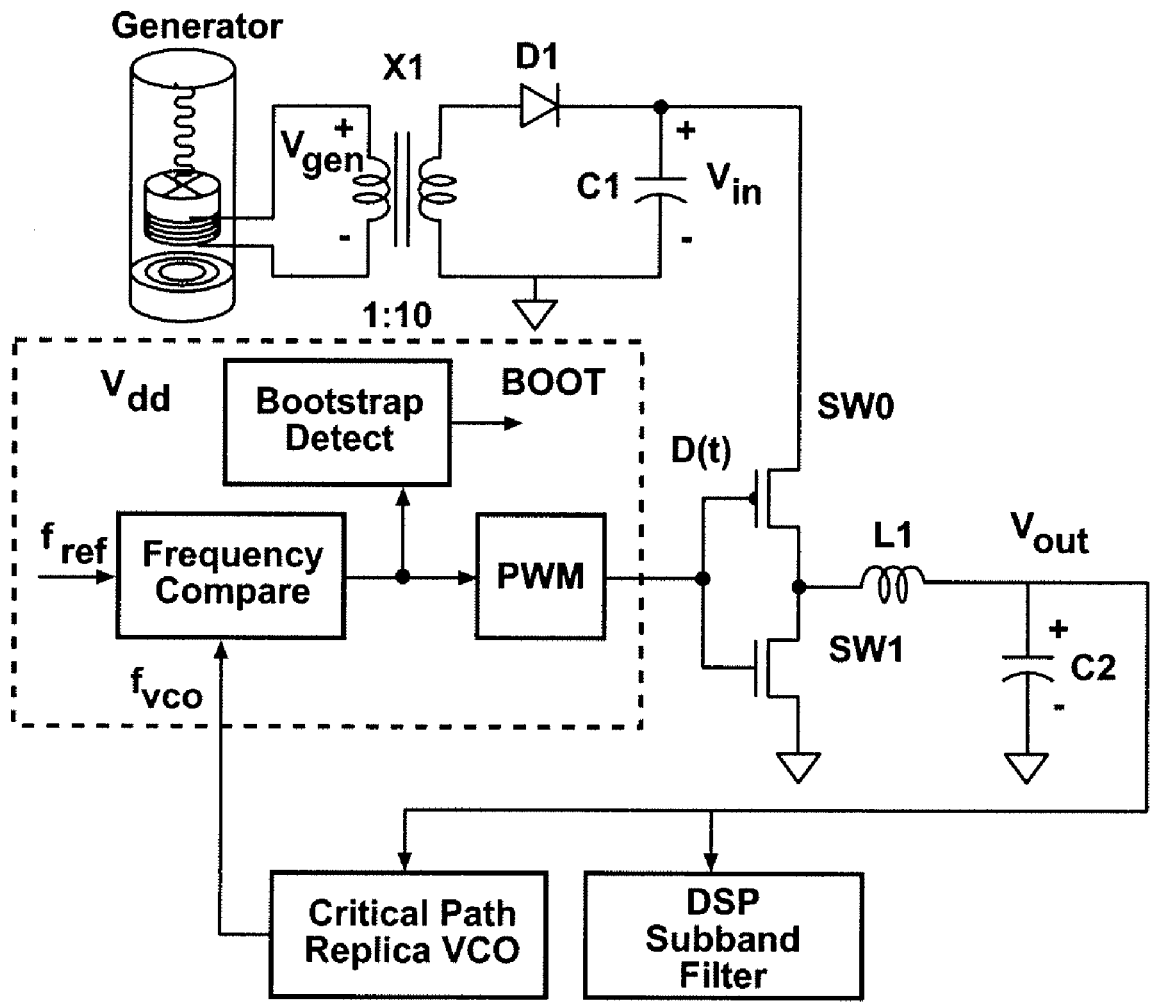
FIG. 13 depicts one embodiment of a control circuit coupled to a system for generating electrical energy from ambient motion.

FIG. 13 depicts one embodiment of a control circuit coupled to a system for generating electrical energy from ambient motion. The control circuit may control how much electrical energy is delivered to a device requiring power, whether the device requires the power to operate or to charge a battery.

Various modifications, changes, and variations apparent to those of skill in the art may be made in the arrangement, operation, and details of the methods and systems of the disclosure without departing from the spirit and scope of the disclosure. Thus, it is to be understood that the embodiments described above have been presented by way of example, and not limitation, and that the invention is defined by the appended claims.

The invention claimed is:

1. A multi-stage system for generating electrical power from motion, comprising:
   a primary stage comprising a resonating electrical generator to convert motion to electrical energy, the generator comprising:
      a coil;
      a first biasing element tuned to resonate at a first frequency; and
      a first magnet generating a magnetic field, the first magnet coupled to the first biasing element and disposed in proximity to the coil such that the coil is located within the magnetic field, wherein the first biasing element enables a resonant oscillation of the first magnet relative to the coil to generate an electric current in the coil; and
   a supplementary stage coupled to the primary stage, the supplementary stage comprising a kinetic energy conversion system to convert motion to stored potential energy, the kinetic energy conversion system comprising:
      a second biasing element to store potential energy by being forced from a resting position to a tension position,
      wherein the second biasing element is tuned to resonate at a second frequency that is lower than the first frequency, and
   wherein the supplementary stage periodically releases the stored potential energy to generate a resonant oscillation at the first frequency to drive the primary stage, and
   wherein the first magnet of the resonating electrical generator is diametrically poled and the first biasing element of the resonating electrical generator comprises a torsion shaft with a fixed end, and the resonating electrical generator further comprises a core coupled to and supporting the coil, and wherein the first magnet is coupled to the torsion shaft and configured to rotate as the torsion shaft twists in response to motion.

2. The system of claim 1, wherein the resonating electrical generator further comprises an offset mass coupled to the torsion shaft, wherein the offset mass increases twisting of the torsion shaft in response to motion.

3. The system of claim 1, wherein the torsion shaft of the resonating electrical generator further comprises a free end opposite the fixed end and wherein the resonating electrical generator further comprises a shaft bearing positioned to support the free end and configured to facilitate rotation of the free end as the torsion shaft moves.

4. A multi-stage system for generating electrical power from motion, comprising:
    a primary stage comprising a resonating electrical generator to convert motion to electrical energy, the generator comprising:
        a coil;
        a core coupled to and supporting the coil, wherein the core is ring-shaped and further comprises a central cross-bar around which the coil is wrapped;
        a first biasing element tuned to resonate at a first frequency, wherein the first biasing element comprises a first cantilever shaft having a free end and a fixed end, wherein the core is coupled to and supports the fixed end of the first cantilever shaft; and
    a first magnet generating a magnetic field, the first magnet coupled to the first cantilever shaft and disposed in proximity to the coil such that the coil is located within the magnetic field, the first cantilever shaft enabling a resonant oscillation of the first magnet relative to the coil to generate an electric current in the coil;
    a second cantilever shaft having a free end and a fixed end, wherein the core is coupled to and supports the fixed end of the second cantilever shaft; and
    a second magnet coupled to the free end of the second cantilever shaft and in proximity to the coil, the second magnet generating a second magnetic field in proximity to the coil such that the coil is located within the second magnetic field, whereby resonant oscillation of the second magnet relative to the coil generates an electric current in the coil; and
    a supplementary stage coupled to the primary stage, the supplementary stage comprising a kinetic energy conversion system to convert motion to stored potential energy, the kinetic energy conversion system comprising:
        a second biasing element to store potential energy by being forced from a resting position to a tension position,
        wherein the second biasing element is tuned to resonate at a second frequency that is lower than the first frequency, and
        wherein the supplementary stage periodically releases the stored potential energy to generate a resonant oscillation at the first frequency to drive the primary stage.

5. A multi-stage system for generating electrical power from motion, comprising:
    a primary stage comprising a resonating electrical generator to convert motion to electrical energy, the generator comprising:
        a first magnet coupled to the first biasing element, disposed in proximity to the coil, and generating a magnetic field such that the coil is located within the magnetic field, wherein the first magnet is diametrically poled; and
        a first biasing element comprising a coil spring coupled to the first magnet at a central axis and tuned to resonate at a first frequency, the coil spring enabling a resonant oscillation of the first magnet relative to the coil to generate an electric current in the coil,
        wherein the first magnet is rotatably movable within the ring-shaped core about the coil spring coupled at the central axis of the magnet and rotation of the first magnet relative to the coil generates an electric current in the coil; and
    a supplementary stage coupled to the primary stage, the supplementary stage comprising a kinetic energy conversion system to convert motion to stored potential energy, the kinetic energy conversion system comprising:
        a second biasing element to store potential energy by being forced from a resting position to a tension position,
        wherein the second biasing element is tuned to resonate at a second frequency that is lower than the first frequency, and
    wherein the supplementary stage periodically releases the stored potential energy to generate a resonant oscillation at the first frequency to drive the primary stage.

6. A multi-stage system for generating electrical power from motion, comprising:
    a primary stage comprising a resonating electrical generator to convert motion to electrical energy, the generator comprising:
        a coil;
        a first biasing element tuned to resonate at a first frequency; and
        a first magnet generating a magnetic field, the first magnet coupled to the first biasing element and disposed in proximity to the coil such that the coil is located within the magnetic field, wherein the first biasing element enables a resonant oscillation of the first magnet relative to the coil to generate an electric current in the coil; and
    a supplementary stage coupled to the primary stage, the supplementary stage comprising a kinetic energy conversion system to convert motion to stored potential energy, the kinetic energy conversion system comprising:
        a second biasing element to store potential energy by being forced from a resting position to a tension position, wherein the second biasing element comprises a torsion spring tuned to resonate at a second frequency that is lower than the first frequency;
        a gear configured to rotate about a center axis and thereby displace the second biasing element;
        a pawl configured to engage the gear, wherein the pawl allows rotation of the gear in only one direction when engaged;
        a pendulum comprising:
            a lever arm with a fixed end and a free end, the fixed end configured to oscillate about the center axis of the gear, wherein the lever arm is configured to engage and rotate the gear as the lever arm oscillates, thereby transferring energy to the gear to displace the second biasing element; and
            a mass coupled to the free end of the lever arm configured to move in response to motion and cause the lever arm to oscillate; and
        a release mechanism configured to disengage the pawl and thereby enable the biasing element to release the stored potential energy, wherein the supplementary stage periodically releases the stored potential energy to generate a resonant oscillation at the first frequency to drive the primary stage.

7. A multi-stage system for generating electrical power from motion, comprising:
a primary stage comprising a resonating electrical generator to convert motion to electrical energy, the generator comprising:
a coil;
a first biasing element tuned to resonate at a first frequency; and
a first magnet generating a magnetic field, the first magnet coupled to the first biasing element and disposed in proximity to the coil such that the coil is located within the magnetic field, wherein the first biasing element enables a resonant oscillation of the first magnet relative to the coil to generate an electric current in the coil; and
a supplementary stage coupled to the primary stage, the supplementary stage comprising a kinetic energy conversion system to convert motion to stored potential energy, the kinetic energy conversion system comprising:
a second biasing element to store potential energy by being forced from a resting position to a tension position, and wherein the second biasing element is tuned to resonate at a second frequency that is lower than the first frequency;
a ring gear having gear teeth on the inside of the gear, wherein the ring gear rotates about a center axis and thereby displaces the second biasing element;
a plurality of gears to engage the gear teeth;
a plurality of pistons configured to turn each corresponding gear, thereby rotating the ring gear to the plurality of tension positions and storing potential energy;
a plurality of disk cam interfaces coupled to each corresponding piston;
a plurality of ball joints;
a plurality of multiaxial vibrating beam-spring systems rotating about a corresponding ball joint and configured to drive the plurality of pistons via the plurality of disk cam interfaces; and
a release mechanism to disengage the plurality of gears from the ring gear and allowing the ring gear to return to the resting position and the biasing element to release the stored potential energy and thereby generate a resonant oscillation of the resonating electrical generator,
wherein the supplementary stage periodically releases the stored potential energy to generate a resonant oscillation at the first frequency to drive the primary stage.

8. The system of claim 7, wherein the ring gear further comprises a plurality of spurs around the outside of the gear, whereby the spurs are configured to strike a portion of the resonating electrical generator and create a resonant oscillation of the resonating electrical generator.

9. The system of claim 7, wherein the plurality of vibrating beam-spring systems are tuned to have a natural frequency near the frequency of an ambient motion.

10. A system for generating electrical power from multi-axial motion, comprising:
a multiaxial resonating electrical generator to convert motion to electrical energy, the generator comprising:
a coil;
a first biasing element tuned to resonate at a first frequency in response to multiaxial motion at or near the first frequency, wherein the first biasing element comprises a torsion shaft with a fixed end; and
a first magnet generating a magnetic field, the first magnet coupled to the first biasing element and disposed in proximity to the coil such that the coil is located within the magnetic field, wherein the first magnet is diametrically poled, coupled to the torsion shaft, and configured to rotate as the torsion shaft twists in response to motion, the rotating motion of the first magnet relative to the coil generates an electric current in the coil, wherein the torsion shaft enables resonant rotational oscillation of the first magnet relative to the coil and thereby generates an electric current in the coil;
a core coupled to and supporting the coil; and
an offset mass coupled to the torsion shaft to increase twisting of the torsion shaft in response to motion; and
a kinetic energy conversion system coupled to the resonating electrical generator to convert motion to stored potential energy, the kinetic energy conversion system comprising:
a second biasing element for storing the potential energy,
wherein the second biasing element is tuned to resonate at a second frequency which is lower than the first frequency,
wherein the kinetic energy conversion system periodically releases the stored potential energy to generate a resonant oscillation at the first frequency to drive the multi-axial resonating electrical generator.

11. The system of claim 10, wherein the torsion shaft of the multiaxial resonating electrical generator further comprises a free end opposite the fixed end and wherein the resonating electrical generator further comprises a shaft bearing positioned to support the free end and configured to facilitate rotation of the free end as the torsion shaft twists.

12. A system for generating electrical power from multi-axial motion, comprising:
a multiaxial resonating electrical generator to convert motion to electrical energy, the generator comprising:
a coil;
a first biasing element tuned to resonate at a first frequency in response to multiaxial motion at or near the first frequency, wherein the first biasing element comprises a first cantilever shaft having a free end and a fixed end; and
a first magnet generating a magnetic field, the first magnet coupled to the first biasing element and disposed in proximity to the coil such that the coil is located within the magnetic field, the first magnet coupled to the free end of the first cantilever shaft, wherein the first cantilever shaft enables resonant oscillation of the first magnet relative to the coil to generate an electric current in the coil; and
a kinetic energy conversion system coupled to the resonating electrical generator to convert motion to stored potential energy, the kinetic energy conversion system comprising:
a second biasing element for storing the potential energy,
wherein the second biasing element is tuned to resonate at a second frequency which is lower than the first frequency,
wherein the kinetic energy conversion system periodically releases the stored potential energy to generate a resonant oscillation at the first frequency to drive the multi-axial resonating electrical generator.

13. The system of claim 12, wherein the multiaxial resonating electrical generator further comprises a core coupled to and supporting the coil.

14. The system of claim 12, wherein the multiaxial resonating electrical generator further comprises:
- a second cantilever shaft having a free end and a fixed end; and
- a second magnet coupled to the free end of the second cantilever shaft and in proximity to the coil, the second magnet generating a second magnetic field in proximity to the coil such that the coil is located within the second magnetic field, whereby resonant oscillating motion of the second magnet relative to the coil generates an electric current in the coil.

15. The system of claim 14, wherein the core of the multiaxial resonating electrical generator is ring-shaped and the core further comprises a central cross-bar around which the coil is wrapped, the ring portion of the core coupled to and supporting the fixed ends of the first and second cantilever shafts.

16. A system for generating electrical power from multiaxial motion, comprising:
- a multiaxial resonating electrical generator to convert motion to electrical energy, the generator comprising:
  - a ring-shaped core;
  - a coil wrapped around the ring-shaped core;
  - a first magnet generating a magnetic field, the first magnet coupled to the first biasing element and disposed in proximity to the coil such that the coil is located within the magnetic field, wherein the magnet is diametrically poled; and
  - a first biasing element comprising a coil spring coupled to the magnet at a central axis and tuned to resonate at a first frequency in response to multiaxial motion at or near the first frequency, the coil spring enabling resonant rotational oscillation of the first magnet relative to the coil to generate an electric current in the coil,
  - wherein the diametrically poled magnet is rotatably movable within the ring-shaped core about the coil spring coupled at the central axis of the magnet and rotation of the magnet relative to the coil generates an electric current in the coil; and
- a kinetic energy conversion system coupled to the resonating electrical generator to convert motion to stored potential energy, the kinetic energy conversion system comprising:
  - a second biasing element for storing the potential energy,
  - wherein the second biasing element is tuned to resonate at a second frequency which is lower than the first frequency,
- wherein the kinetic energy conversion system periodically releases the stored potential energy to generate a resonant oscillation at the first frequency to drive the multiaxial resonating electrical generator.

* * * * *